(12) United States Patent
Church et al.

(10) Patent No.: US 7,594,270 B2
(45) Date of Patent: Sep. 22, 2009

(54) THREAT SCORING SYSTEM AND METHOD FOR INTRUSION DETECTION SECURITY NETWORKS

(75) Inventors: Christopher A. Church, Houston, TX (US); Mikhail Govshteyn, Houston, TX (US); Christopher D. Baker, Pearland, TX (US); Christopher D. Holm, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 685 days.

(21) Appl. No.: 11/321,620

(22) Filed: Dec. 29, 2005

(65) Prior Publication Data

US 2007/0169194 A1 Jul. 19, 2007

Related U.S. Application Data

(60) Provisional application No. 60/639,923, filed on Dec. 29, 2004.

(51) Int. Cl.
*G08B 23/00* (2006.01)
(52) U.S. Cl. ...................................... 726/23
(58) Field of Classification Search ........................ None
See application file for complete search history.

(56) References Cited

U.S. PATENT DOCUMENTS

2003/0014662 A1* 1/2003 Gupta et al. ................. 713/200

FOREIGN PATENT DOCUMENTS

WO WO 2006/079185 A2 7/2006

OTHER PUBLICATIONS

International Search Report and Written Opinion, PCT/US05/47419, Nov. 13, 2006.
Cheung, et al., "Modeling Multistep Cyber Attacks for Scenario Recognition", vol. 1, pp. 284-292, Apr. 22, 2003.
GIAC Certified Intrusion Analyst (GCIA) Practical Assignment, certify@giac.org, 9 pages, Jul. 22, 2004.
International Preliminary Report on Patentability and Written Opinion issued in PCT/US2005/047419 dated Jul. 3, 2007, 7 pages, Alert Logic, Inc.

* cited by examiner

*Primary Examiner*—Brandon S Hoffman
(74) *Attorney, Agent, or Firm*—Sprinkle IP Law Group

(57) ABSTRACT

Embodiments of the invention provide a security expert system (SES) that automates intrusion detection analysis and threat discovery that can use fuzzy logic and forward-chaining inference engines to approximate human reasoning process. Embodiments of the SES can analyze incoming security events and generate a threat rating that indicates the likelihood of an event or a series of events being a threat. In one embodiment, the threat rating is determined based on an attacker rating, a target rating, a valid rating, and, optionally, a negative rating. In one embodiment, the threat rating may be affected by a validation flag. The SES can analyze the criticality of assets and calibrate/recalibrate the severity of an attack accordingly to allow for triage. The asset criticality can have a user-defined value. This ability allows the SES to protect and defend critical network resources in a discriminating and selective manner if necessary (e.g., many attacks).

26 Claims, 8 Drawing Sheets

THREAT SCORING SYSTEM AND METHOD FOR INTRUSION DETECTION SECURITY NETWORKS

CROSS REFERENCE TO RELATED APPLICATION(S)

This application claims priority from U.S. Provisional Patent Application No. 60/639,923, filed Dec. 29, 2004, and entitled "DYNAMIC THREAT RATING SYSTEM AND PROCESS FOR COMPUTER INTRUSION DETECTION," which is hereby fully incorporated herein by reference for all purposes.

TECHNICAL FIELD OF THE INVENTION

This invention relates generally to network security management. More particularly, embodiments of the present invention relate to a system and method for automatically, accurately, and dynamically identifying and assessing network security threats and security incidents.

BACKGROUND OF THE INVENTION

Intrusion techniques (commonly termed "hacking") present security threats, often dangerous, to computer systems and data. The danger increases in network systems that rely on interconnectivity. Thus, today's network systems generally employ intrusion management technologies to make their networks more defensible to attacks. Two types of network-based intrusion management technologies are known in the art: intrusion detection systems (IDS) and intrusion prevention systems (IPS).

IDS-based systems are typically standalone appliances designed to look for signs of intrusions in network traffic and generate security alarms accordingly. They rely on hard coded threat values and human expertise in analyzing threats, which can be in the hundreds or even thousands. One significant problem with the hard coded threat values approach is that it typically only considers how dangerous an attack itself is and ignores an enormous amount of information that can dramatically impact the true level of the security threat. For example, the criticality or value of a system or business asset that is being targeted by an attack may determine whether an action needs to be taken and whether a priority relevant to the action may apply. Another problem is that because it only considers how dangerous an attack itself is based on hard coded threat values, it does not discriminate threats against individual systems. As one skilled in the art may appreciate, some threats that are dangerous for one network system (i.e., may cause damages) may not impose a real world threat to another network system. For example, a UNIX®-based system may be immune to a Windows®-based attack, so no actions may be necessary.

IDS-based systems typically have no prior network knowledge or target awareness. To determine whether a network is being targeted by and subject to damage from a particular threat, many network systems rely on human experts (i.e., security administrators or analysts) to investigate and analyze security alarms on a manual and ad-hoc basis. The accuracy and effectiveness of a threat analysis may vary from system to system and depend on the particular knowledge and abilities of individual human experts. Moreover, an IDS-based system may continuously generating hundreds and hundreds of security alarms that must be reviewed by security administrators or analysts 24 hours a day, seven days a week. In some cases, due to the complexity and perhaps the number of threats involved, it may not be viable or even possible to review all security alarms and perform threat analyses accordingly in a timely manner.

To address some of the drawbacks of IDS-based systems, some prior efforts offered inline intrusion prevention systems (IPS) that attempt to block attacks before reaching their targets. Like the IDS, IPS-based systems also typically utilize hard-coded threat values. Typically, the actual threat value in most existing IPS-based systems is a hard-coded value associated with an attack type (e.g., "low", "med", or "high"). In other words, threats are ranked by type for human review and are not scored based on their real ability to intrude a particular network and/or to cause damages. Typically, each hard coded threat value is associated with an event type or a specific event. The meaning of the term "event" may vary from system to system, dependent upon each system's underlying technology. Currently, there are the two primary technologies for network-based intrusion detection and prevention systems. The first is commonly referred to as "signature-based", where a signature defines both the meaning of an event (e.g., an attempt to exploit a vulnerability, a list of reference items, etc.) and a set of patterns by which to identify such an event on a network (e.g., a string of text to be found in the payload of a TCP packet). The second is commonly referred to as "anomaly-based", wherein events are represented as deviations from normal behavior, and usually have no indication of a specific attack or any pre-defined patterns to match in network content.

Prior network-based intrusion detection and prevention systems (IDS and IPS) are affected by the same problems and have the same fundamental limitations. For example, accuracy in actual threat detection is low and false positives often result in a denial of network service to valid customers. Consequently, in real world deployments, the majority of network intrusion detection and prevention systems operate passively without filtering a single packet, which means that most of the security alarms must still be analyzed by human experts (i.e., security administers or analysts) using the same tedious manual process.

Another limitation is that these existing network intrusion detection and prevention systems are designed to make binary (e.g., true/false or yes/no) decisions about each potential threat based on a limited number of pre-coded questions (e.g., 1-10 questions). If the first answer happens to be false, the decision process stops and ignores the rest of the questions, making a quick exit out of a binary decision tree. Due to the binary nature of this decision making process, relevant or event critical information may not be asked and/or taken into consideration in determining the relevance and/or severity of a security threat. As a result, having a wrong answer early on in the decision tree may compromise the security of the system. For example, a security system may detect an event which may target a particular host. The system checks the list of hosts and decides that the event can be dropped because the target host is not on the list. Unbeknownst to the system, the list of hosts does not include a newly installed server, which happens to be just what that particular event targets. Thus, the answer to the first question (i.e., "does this event target any host known by the system?") was a wrong answer and the new server is exposed and vulnerable to that particular attack.

Yet another limitation is that these existing network intrusion detection and prevention systems are designed to be fast and efficient, producing no noticeable degradation to network performance. Consequently, they cannot perform the following tasks in real time:

1) Take the necessary time to learn the protected network;
2) Make complex decisions about attacks that may span more than a limited number of packets;
3) View intrusions as event scenarios;
4) Correlate attack and vulnerability information;

5) Detect attacks involving numerous steps or network sessions; and
6) Handle spatially and temporally distributed attacks.

A need exists for a more complete intrusion detection solution to defensible networks that can provide a real-time correlation, ongoing vulnerability discovery, and active intrusion defense, automating the reasoning process performed by human security experts. Embodiments of the present invention address this need and more.

SUMMARY OF THE INVENTION

Embodiments of the present invention provide a viable and more complete intrusion management solution to defensible networks. In one embodiment, the reasoning process performed by human security experts is automated via a security expert system (SES). The SES provides automated analyses of incoming security events and generates a confidence rating that indicates whether an event, or series of events, constitutes a threat to the network in which the ISES services.

One embodiment of the SES can be deployed as software and hardware appliances that continuously learn about a network's vulnerabilities and monitor attacks on network resources (e.g., firewalls, applications and servers).

One embodiment of the SES utilizes known analysis techniques such as heuristic data and takes into account user supplied information about the value of resources on the network. In one embodiment, heuristic data and user supplied information are stored in a central database server.

One embodiment of the SES can be trained via a knowledge base to learn about new attack vectors and techniques without human intervention. In one embodiment, the SES is trained using a novel Security State Definition Language (SSDL). In one embodiment, optimized learned data is stored in a central database server.

In one embodiment, the SES can process incoming security events and generate a dynamic network threat rating based on attack severity and target specific metrics (e.g., host criticality, number of active services, number of potential exposures and number of verified vulnerabilities).

In one embodiment, the SES can provide correlation of attacks to vulnerabilities present on a target host residing in the network protected by the SES.

In one embodiment, the SES can provide validation of successful compromise based on response analysis, payload analysis, correlated event groups and attack patterns.

In one embodiment, the SES can provide invalidation of false positives and false alarms through advanced packet payload analysis on attacks and responses.

In one embodiment, the SES can provide automated defensive and/or corrective actions by dynamically configuring existing firewalls and access control devices to block validated threats.

In one embodiment, the SES can provide automated containment actions by shutting down switch ports of compromised or worm infected hosts, thus dynamically removing them off the network.

One advantage provided by embodiments of the SES disclosed herein is their flexibility and ability to be rapidly deployed to add new inference logic as well as knowledge without requiring the underlying software to be reengineered. The speed, efficiency and rapid automation of human reasoning and deployment thereof can be particularly critical in the field of network security where new problems that must be analyzed differently than before can emerge very fast and without warning. As an example, according to one embodiment, a new expert technique necessary to analyze and validate an event involving a new worm can be deployed to a system implementing an embodiment of the SES in hours. In comparison, deployment of traditional network intrusion management systems can take days or even weeks.

Another advantage provided by embodiments of the SES disclosed herein is that they resemble human reasoning, unlike traditional network intrusion management systems that are designed to make binary decisions which may be based on fragmented information and incomplete evidence of attacks. Rather than attempting to provide an absolute result, embodiments of the SES disclosed herein can provide the best possible answer and a confidence score (e.g., a threat rating), substantially reducing or eliminating false positive results and producing more efficient and effective alarms (e.g., only alarms on security threats that have a high probability of success).

Other objects and advantages of the present invention will become apparent to one skilled in the art upon reading and understanding the detailed description of the preferred embodiments described herein with reference to the following drawings.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION

Figure 1:
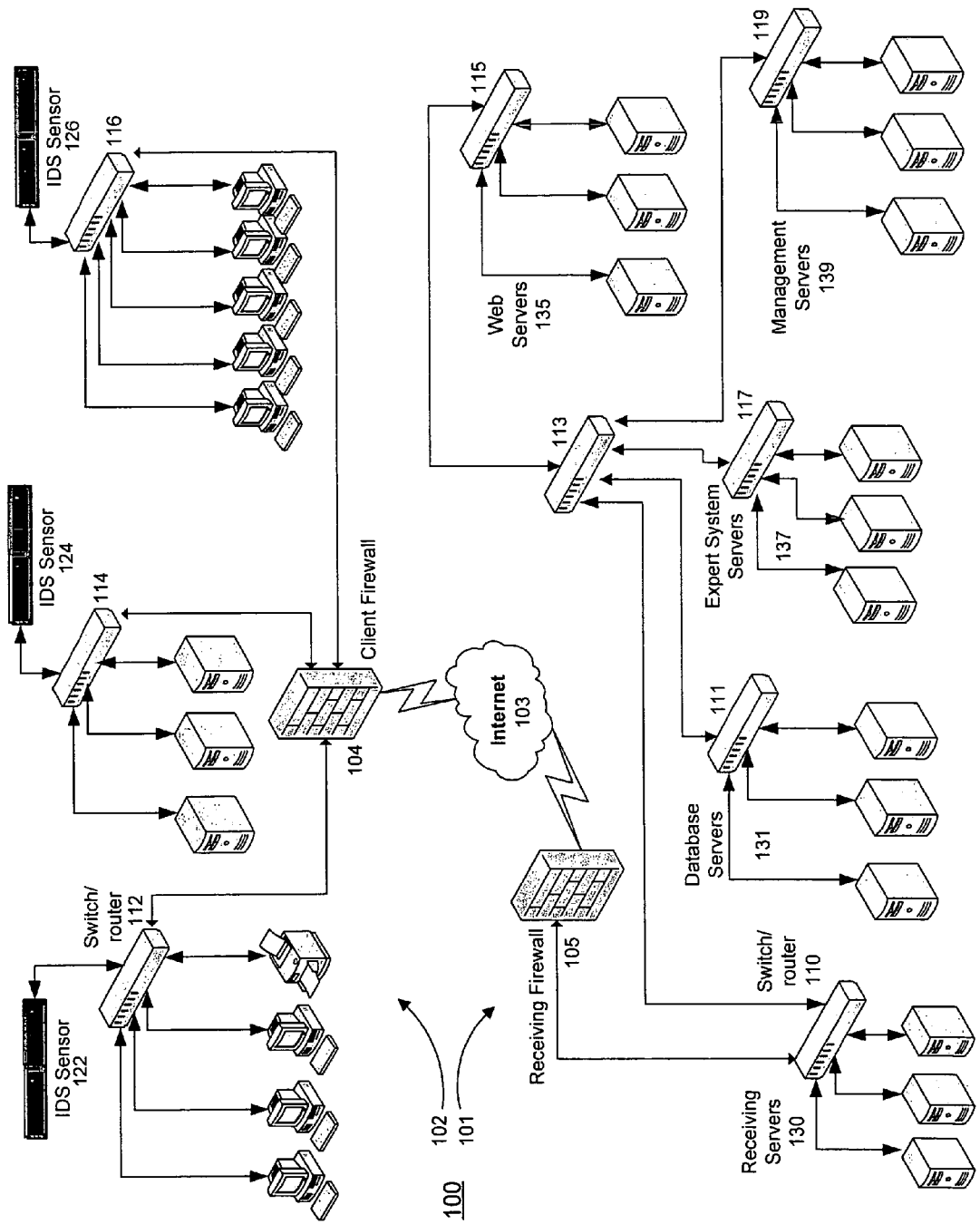
FIG. 1 is a diagrammatic representation of an overall architecture wherein embodiments of the present invention may be implemented.

The present invention and various features and advantageous details thereof will now be described with reference to the exemplary, and therefore non-limiting, embodiments that are illustrated in the accompanying drawings. Descriptions of known programming techniques, computer software, hardware, network communications, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As network security threats continue to evolve and become more sophisticated each and everyday, it has become a constant struggle for security systems to keep track of what network security threats are dangerous to which machine on what network. Existing network-based intrusion detection and prevention (referred to hereinafter as "intrusion management") systems, whether they are signature-based or anomaly-based, rely heavily on human experts to analyze potential threats and take defensive/corrective actions. The problem with information overload cannot be resolved using a new intrusion detection technique or a more advanced analysis algorithm. The data generated by today's intrusion management products is far too complex, too varied and too fragmented for human experts (i.e., security administrators or analysts) to properly and accurately analyze incoming security threats in a timely and effective manner.

Recently, limited expert system concepts are beginning to be used to manage enterprise-wide security. Expert systems can be seen as computer systems programmed to solve problems that generally involve the knowledge of human experts. Expert systems allow application developers to write programs and experts to write expert rules. Expert system programs then use these rules to analyze information. Expert systems rely on expertise expressed exclusively in the rule base. A basic implementation of an expert system can be as simple as a series of true/false or yes/no questions.

Expert systems adopted for security analysis typically manage enterprise-wide security by aggregating and correlating event logs. The most mature expert systems adopted for security analysis can be found in research labs (e.g., the EMERALD project and the Correlated Attack Modeling Language (CAML) project developed by SRI International based in Menlo Park, Calif., U.S.A.). These prior expert systems have several limitations. For example, first, they do not compare hosts on the network. Second, they do not consider or analyze historical data. Third, they determine only whether an attack is valid. They do not analyze a target host's response and/or behavior to learn whether an attack was actually successful. Forth, they do not consider or analyze the aggressiveness of an attacker. Consequently, these prior expert systems are unable to provide a fully automated, complete network security management solution to defensible networks.

As will be described herein in more details later, embodiments of the present invention provide an advanced, commercially viable security expert system (SES) that does not have these limitations. More specifically, embodiments of the SES can compare exposures of hosts on the network protected by the SES, taking into consideration historical data (e.g., how many and what attacks to which target hosts have occurred in the past 48 hours and/or 30 days, how many times and how often a particular attacker has generated how many attacks, etc.) and user-supplied security information (e.g., asset criticality, negative rating, etc.). Accordingly, each threat rating can be tailored to accurately reflect the true severity of a potential security threat. Further, in addition to attack validation, embodiments of the SES can analyze responses and behaviors of target hosts to determine whether the validated attack was actually successful. The SES can then calibrate or recalibrate the vulnerability of target hosts and apply the calibrated vulnerability of target hosts accordingly in future decisions. This helps to further ensure the accuracy of threat ratings thus generated. Moreover, embodiments of the SES can analyze the aggression of an attacker (i.e., how aggressive an attacker is) by monitoring and determining the number of recurrences and velocity of attacks within a certain time period. The aggressiveness of an attacker may affect the severity of an attack and hence its threat rating (i.e., the greater the aggression of the attacker, the more likely that the attacker might succeed in the near future.)

FIG. 1 is a diagrammatic representation of an overall architecture wherein embodiments of the SES may be implemented. In the exemplary deployment shown in FIG. 1, a security expert system (SES) 100 comprises a SES server network 101 and a client network 102 connected to SES server network 101 through the Internet 103 via known network communications means. Client network 102 comprises a plurality of internal networks. Each client internal network can have a plurality of network resources (e.g., computers, printers, server machines, etc.) and each client internal network is connected to a client firewall 104 via a network switch (e.g., 112, 114, 116). Other configurations and arrangements of SES 100 are possible.

According to one embodiment, each switch (e.g., 112, 114, 116) has an intrusion detection system (IDS) sensor (e.g., 122, 124, 126) operatively coupled thereto or residing therein. In one embodiment, an IDS sensor is a hardware device or appliance programmed to collect information from client network switches (e.g., 112, 114, 116) and transmit the collected information to SES server network 101. Unlike conventional intrusion management products which typically connect directly to or resides at a client firewall for monitoring network traffic coming from the Internet only, IDS sensors 122, 124, 126 operate to monitor and gather information from internal network traffic (e.g., by monitoring interfaces such as a span port of a switch) as well as external network traffic coming from the Internet 103. In one embodiment, all internal network traffic through a switch can be mirrored to an IDS sensor connected thereto (e.g., using a passive mode). Data collected by an IDS sensor (e.g., target host responses to an internal broadcast) can be transmitted through an encrypted connection of the Internet 103 to a receiving end (e.g., receiving servers 130) at SES server network 101. Any number of IDS sensors may be implemented to suit embodiments of the SES disclosed herein. It should also be understood that the functionality of the IDS sensor can be incorporated as software and/or firmware into switches 112, 114, 116.

In the example shown in FIG. 1, SES server network 101 comprises a receiving firewall 105, a plurality of switches (e.g., 110, 111, 113, 115, 117, 119), and a plurality of groups of servers (e.g., receiving servers 130, database servers 131, expert system servers 137, Web servers 135, and management servers 139) connected to the plurality of switches (e.g., 110, 111, 113, 115, 117, 119). Other configurations and arrangements of SES server network 101 are possible. For example, each group of servers may be implemented in one or more machines.

One function of receiving servers 130 is to receive data (e.g., events) transmitted by any of the IDS sensors located at client network 102. Received data is then transmitted over to database servers 131 for storage. In one embodiment, a queuing server may be utilized to improve speed. Another function of receiving servers 130 is to interface with external units (e.g., IDS sensors 122, 124, 126). According to embodiments of the invention, the intelligence of the SES 100 resides at SES server network 101. That is, SES 100 is configured such that commands from various servers located at SES server network 101 are transmitted to data collection units (e.g., IDS sensors 122, 124, 126) located at client network 102 through receiving servers 130. In this way, a SES server can control and instruct an IDS sensor at a client site to take a defense action, upgrade software, reboot itself, etc.

One function of database servers 131 is to hold permanent data (e.g., events transmitted by receiving server 130). Another function of database servers 131 is to serve as a SES state engine by providing events to the state engine and store temporary data (e.g., learned data) from the state engine. The functionality of database servers 131 will be described in more details later with reference to FIG. 3.

Web servers 135 implement a Web-based user interface through which SES 100 can interact with an end user. For example, through the user interface, SES 100 can tell the end user what decisions it made (e.g., threat ratings) and how and why it made those decisions. In other words, Web servers 135 serve as an interface between SES 100 and end users who have authorized access to SES 100. The functionality of Web servers 135 will be described in more details later with reference to FIG. 3.

Expert system servers 137 implement the core analysis functionalities of SES 100. Embodiments of SES 100 implementing these SES functionalities will be described in more details below with reference to FIGS. 2-8. Management servers 139 implement the management functionality of SES 100. For example, management servers 139 can be queried on the status of SES 100 and restart SES 100 if necessary.

Figure 2:
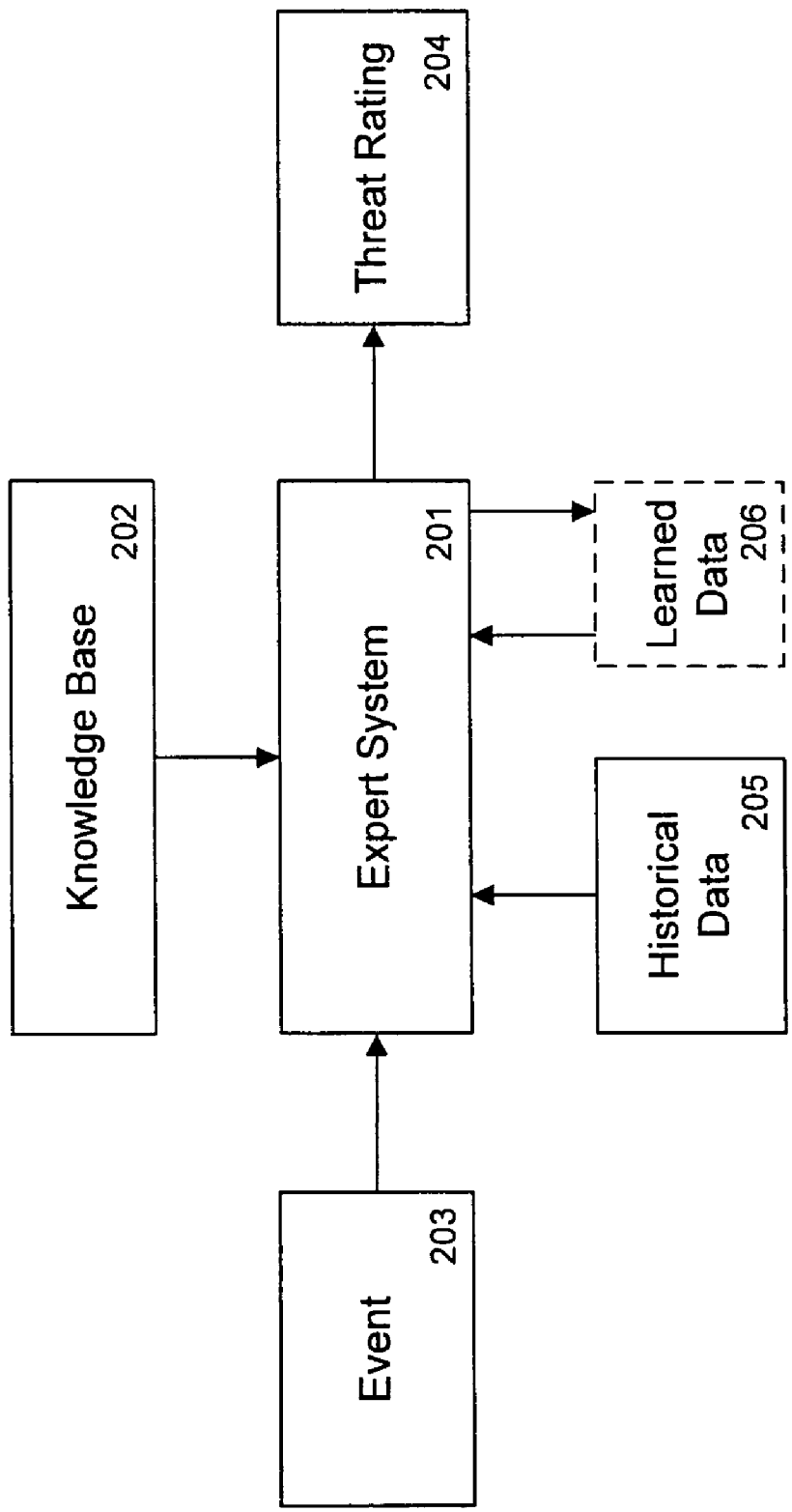
FIG. 2 is a diagrammatic representation of a security expert system capable of providing automated analysis of all incoming security events and generating threat rating accordingly, according to embodiments of the present invention.

FIG. 2 is a diagrammatic representation of a security expert system (SES) 200 capable of providing automated analysis of incoming security events and generating threat rating accordingly, according to embodiments of the present invention. Embodiments of SES 200 can analyze very complex problems through inference engines and generate a confidence rating about the results using fuzzy logic reasoning. In one embodiment, the ability of SES 200 to analyze and reason like a human security expert can be achieved by training SES 200 through a knowledge base built in a proprietary Security State Definition Language (SSDL) like, for example, the SSDL developed by Alert Logic, Inc. of Huston, Tex., USA. However, it should be understood that embodiments of the invention disclosed herein can be implemented using other programming languages. An inference engine can be of a forward-chaining or backward-chaining type. A forward-chaining inference engine goes from an unknown state (e.g., "how serious is this threat to the network?") through various rules applied to data at hand to reach a conclusion (e.g., a threat rating that indicates the severity or seriousness of the attack.) A backward-chaining inference engine does the opposite and starts with a conclusion (e.g., "this is the most serious threat to the network") and breaks down the conclusion by applying rules to available data to ascertain a confidence level of that conclusion. Preferably, embodiments of the SES utilize forward-chaining inference engines. Other implementations (e.g., backward-chaining inference engines) are also possible.

In the embodiment of FIG. 2, SES 200 implements an expert system 201 programmed with computer-executable instructions to process and analyze an event 203 according to expert rules from knowledge base 202 and data from a central database (e.g., historical data 205 stored at database servers 131). Event 203 may be retrieved from the central database as well. In one embodiment, expert rules are part of the knowledge base of expert system 201. In one embodiment, expert rules are written in SSDL.

Optionally, expert system 201 can utilize optimized, trained information from learned data 206, which is a subset of historical data 205 and which can be stored in a trained data area (e.g., a temporary memory) for optimal performance. In one embodiment, a threshold is established to facilitate the decision making process in selecting either historical data 205 or learned data 206. This threshold can be based on how many decisions need to be made in real time versus how much data is needed to make those decisions. Leaned data 206 could be useful in isolating relevant information out of an event. For example, event 203 may have hundreds of different properties, which may cover from packet headers to lists of target hosts to a worm scan type. In many cases, only a portion of those properties (e.g., the scan type and the lists of target hosts) may need to be placed in a trained data area for future decisions (e.g., "Has this target host been scanned? If so, by what type of scan and by whom?"). In this way, expert system 201 can obtain relevant information in a fast and efficient manner from learned data 206.

In one embodiment, expert system 201 utilizes optimized information from learned data 206 and applies expert rules from knowledge base 202 against event 203 to generate a threat rating 204. The functionality of expert system 201 will be further described in detail with reference to FIG. 3, which shows an embodiment of SES 200 having an expert system 301. Within this disclosure, the terms "threat scoring", "threat rating", and "threat confidence" may be used interchangeably. In one embodiment, a threat rating is a value normalized to have a range between 0 and 100. According to embodiments of the invention, a threat rating indicates the likelihood of an event being a threat to the network, and the subjective value of loss if the event is not responded to (i.e., no defensive or corrective action is taken). For example, threats in the ranges of 0-30 may indicate no to little threat, whereas all ranges above 30 may indicate an escalated or elevated level of threat. Embodiments of the invention can identify false positives and false alarms and give them appropriately lower threat scores. Through a Web-based user interface as described above, an end user may elect to view only medium to high threat events, effectively eliminating the majority of false positives (i.e., false alarms) thus identified.

One additional advantage provided by embodiments of the invention is the visibility of events through threat ratings. Unlike prior intrusion management products, events that do not match any one of a series of checks (e.g., operating system checks, known vulnerability, etc.) are not necessarily eliminated. In one embodiment, each incoming event is analyzed and all relevant checks are run against the event to accurately rate the threat of the event, and predict the future success of an attacker. Accordingly, users can view false positive events and low-positive events which are known to provide an understanding about the nature of traffic on a network and a baseline of activity to compare against potential attacks, and which can serve as an early-warning system to burgeoning attacks. In this way, false-positives can be properly reduced in a custom manner by tuning each IDS sensor to the nature of traffic on a particular client network and by continuing to do so as the network topology and use changes. Similarly, low-positives can easily be ignored or sorted out by users utilizing the associated threat ratings.

According to embodiments of the invention, a threat rating for a security event is determined based on a plurality of factors (e.g., information about the event type or signature, validity of an attack, severity of the attack, the value of the resources targeted, etc.). Within the scope of this invention, the term "signature" has a special meaning and is typically broader than when the term is used with regards to "signature-based" intrusion detection and prevention systems. Within this disclosure, the term "signature" refers to a unique identifier for an event, indicating its system and/or subcomponent of origin and, when applicable, a specific type of behavior being represented by the event. In this manner, embodiments of the invention can process and analyze an event originating from either a signature-based or anomaly-based detection engine (e.g., IDS sensors 122, 124, 126). In one embodiment, the term "event" refers to a network packet. Within this disclosure, an event can be a "signature-based" event or an "anomaly-based" event.

According to embodiments of the invention, a threat score can be generated by examining three basic sets of information: the skill and history of the attacker, the value of a resource being attacked, and the likelihood of the attack succeeding. To fully realize such a calculation, several important pieces of data besides the event itself must be collected, including vulnerability data about hosts, assigned criticality to resources (e.g., given hosts and networks), and, in many cases, all responses from the target host to the attacker.

Figure 3:
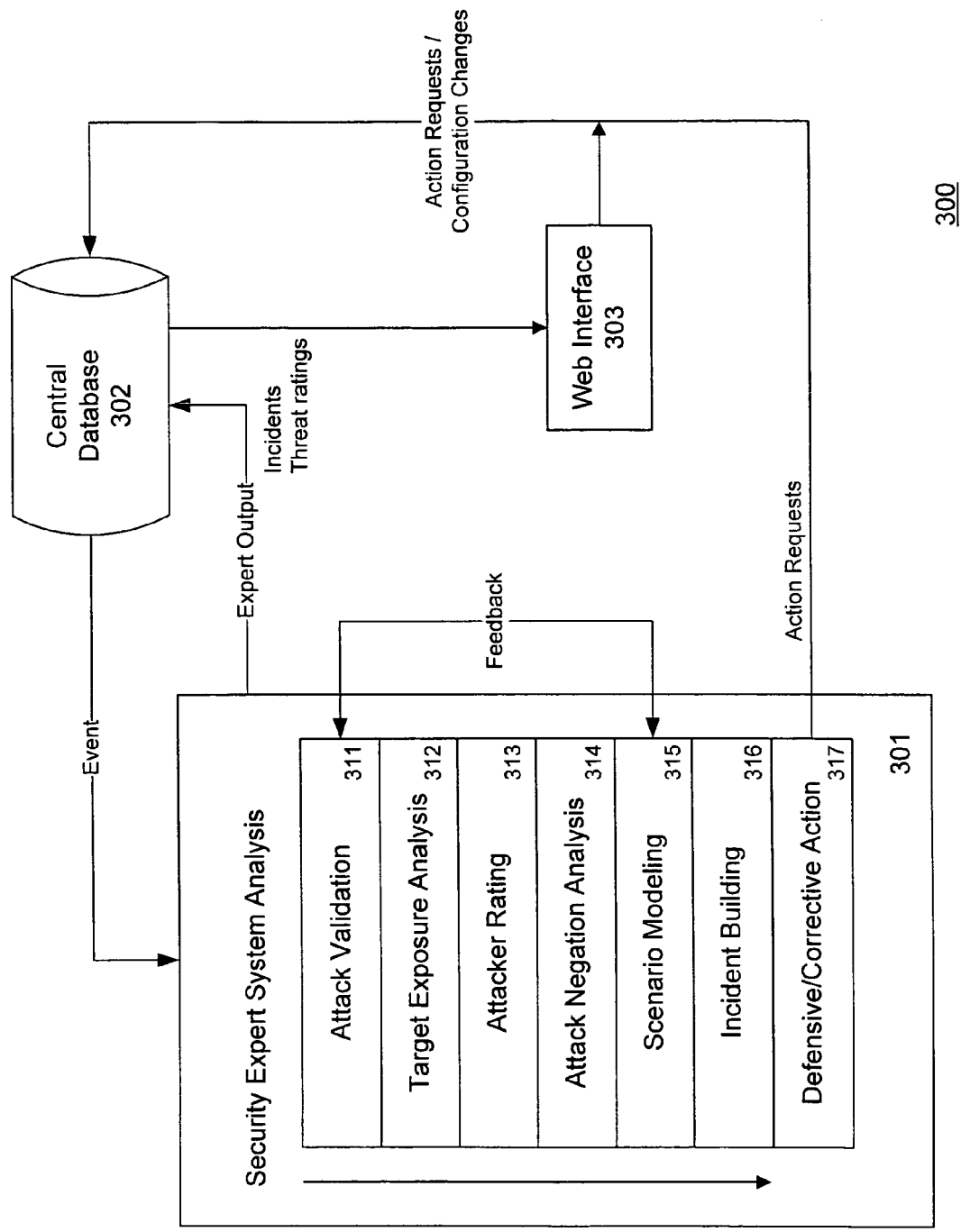
FIG. 3 is a diagrammatic representation of a security expert system having a Web interface coupled to a central database, according to embodiments of the present invention.

FIG. 3 is a diagrammatic representation of a security expert system 300, according to one embodiment of the present invention. In the embodiment shown in FIG. 3, SES 300 comprises an expert system 301, a Web interface 303, and a central database 302 in communication with expert system 301 and Web interface 303. Expert system 301 is capable of retrieving and analyzing events from central database 302 and generating appropriate outputs (e.g., event information, incidents, threat scores, etc.) for storing at central database 302. Central database 302 is configured to interact with Web interface 303 (e.g., providing incidents, threat scores, etc. to be displayed via Web Interface 303 and storing action requests and/or configuration changes provided by a user via Web interface 303). In one embodiment, action requests may be automatically generated by Defensive/Corrective Action 317. In one embodiment, defensive and/or corrective actions can be communicated to one or more remote IDS sensors (see, e.g., 122, 124, 126 of FIG. 1) located behind a client's firewall (see, e.g., 104 of FIG. 1). Specific examples of this automated defense capability are provided below.

In the embodiment of FIG. 3, the knowledge base of SES 300, and more specifically, expert system 301, comprises the following components: Attack Validation 311, Target Exposure Analysis 312, Attacker Rating 313, Attack Negation Analysis 314, Scenario Modeling 315, and Incident Building 316 components. Each component may have a set of security expert rules and/or functionality as well as user-configurable values associated therewith. In one embodiment, a forward-chaining inference engine runs these components in parallel and makes decisions appropriate to each component so that an appropriate threat rating or threat score can be accordingly generated for each event. In the example shown in FIG. 3, a feedback loop exists between Attack Validation 311 and Scenario Modeling 315. This configuration allows Attack Validation 311 and Scenario Modeling 315 to draw information from one another. More generally, although decisions are made in a parallel fashion, one process can query the other to obtain additional information necessary to make an appropriate decision. This way, no decision is final until all appropriate questions have been asked. For example, Attack Validation 311 can query Scenario Modeling 315 on whether a particular event is part of an attack scenario. If so, that information might increase a certain rating value within Attack Validation 311. One embodiment of Attack Validation 311 will be described in more details below with reference to FIG. 5. One embodiment of Target Exposure Analysis 312 will be described in more details below with reference to FIG. 6. One embodiment of Attacker Rating 313 will be described in more details below with reference to FIG. 7. Attack Negation Analysis 314 is attack-specific and can be optional. Incident Building 316 and Defensive/Corrective Action 317 are also optional.

Figure 4:
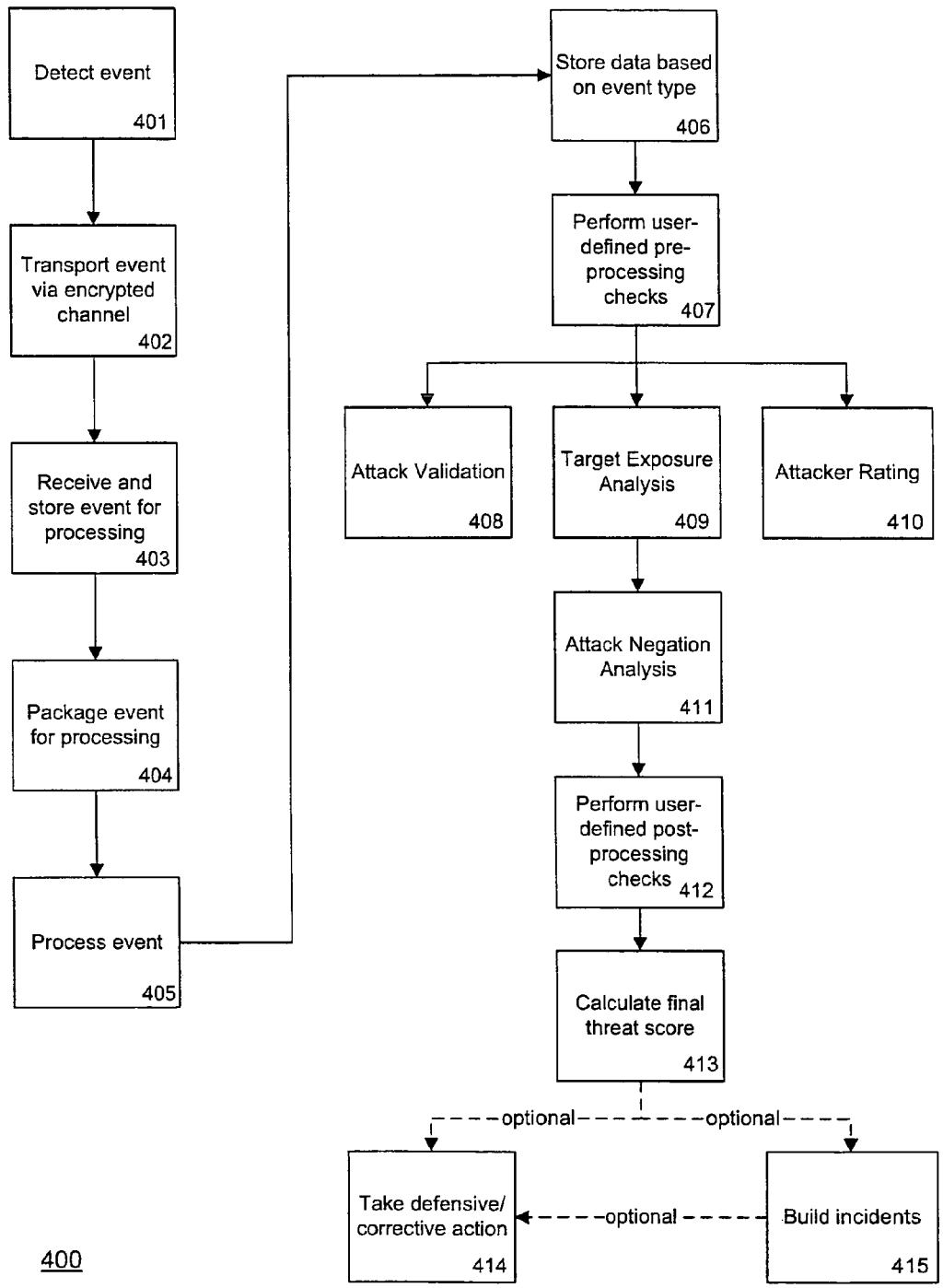
FIG. 4 is a flow diagram illustrating a plurality of processing steps, analyses, and checks performed by embodiments of a security expert system disclosed herein.

FIG. 4 illustrates a flow diagram 400 illustrating the functionalities of each of these components, according to one embodiment of the invention. Referring also to FIG. 1, flow 400 begins at step 401 when an event is detected by a sensor (e.g., IDS sensor 122, 124, or 126) located at a client's site (e.g., client network 102). Because the sensor is configured to monitor both internal traffic and external traffic on the client's network, the event can be originated from either an internal source or an external source. According to one embodiment, an event is anything that can be monitored in the network traffic (e.g., a network packet) that may be of interest to the security expert system. An event may or may not be an attack (e.g., communications about an attack between two servers on the client network). An event may be of interest if it matches a signature, meets or causes a defined level of abnormality (e.g., causes abnormal behavior of the network), or relates to another event that matches a signature or meets a measure of abnormality (e.g., a chain of events), and so on. The length of an event is configurable and can range from 5 to 50 packets, depending upon the level of interest (e.g., 10 packets may be needed to analyze a response while 50 packets may be needed to analyze a payload, etc.) and other relevant factors (e.g., network performance, capability of sensors, etc.).

At step 402, the event is communicated to a receiving server (e.g., one of receiver servers 130) through an encrypted channel. As illustrated in FIG. 1, an encrypted channel may encompass a sensor (e.g., IDS sensor 122), a first switch (e.g., switch 112), a client firewall (e.g., firewall 104), the Internet (e.g., Internet 103), a receiving firewall (e.g., firewall 105), and a second switch (e.g., switch 110). At step 403, the receiving server receives the event and stores it at a central database (e.g., database servers 131) for processing. The receiving server can be configured to receive events from a plurality of sensors in a parallel fashion. In one embodiment, events received from a sensor can be processed in the order in which they are received (e.g., within a chain of events). It is also possible to process events out of order (e.g., a sensor detects events out of order).

Steps 404, 405, and 406 can be optional. In embodiments of the invention, each step may be implemented via one or more software modules. In the example shown in FIG. 4, at step 404, the event is packaged as an object, which can have a plurality of properties (e.g., event class, etc.). Step 404 can utilize known event processing techniques. At step 405, the properties of the event object are determined. Utilizing, for example, any suitable event classification technique known in the art, step 405 can process events into groups or clusters to facilitate optimal decision making with regards to rules at hand. For example, a class may represent a group of events that are similarly validated. Thus, in determining what set(s) of rules or rule base is to be run against a particular event, it may be more efficient to focus on rules that are relevant to the event's class or type, rather than indiscriminately asking all questions and making all possible decisions. At step 405, selective information about the event that may be useful in making future decisions can be discovered (e.g., a list of target hosts of a network scan may be of interest in making a decision later on whether a new event constitutes a threat). At step 406, learned data discovered at step 405 is stored based on event type to a trained data structure for future decisions. As described above with reference to FIG. 2, learned data is a subset of historical data that is stored at an optimized location that can be accessed faster than the full set of historical data. Learned data can be optionally implemented in embodiments of the SES disclosed herein to enhance performance.

Step 407 can also be optional. Embodiments of the invention allow for a user to define rules (e.g., pre-processing, post-processing, etc.) that may affect the final threat rating for an event. User-defined rules can be tailored to suit various implementations and can differ from system to system. For example, a user-defined rule regarding the criticality of certain business assets may be run at step 407, before applying Attack Validation 408, Target Exposure Analysis 409, and Attacker Rating 410.

As exemplified in FIG. 4, Attack Validation 408, Target Exposure Analysis 409, and Attacker Rating 410 can operate in parallel and are not dependent upon one another, although they can provide feedback to each other. Briefly, Attack Validation 408 can determine whether an attack is an actual attack, what is the likelihood of success for the attack, whether the target host is vulnerable to the attack, and whether the attack actually succeeded by examining post-attack communications between the target host and the attacker. According to one embodiment of the invention, Attack Validation 408 can generate a validation rating (e.g., "ValidRating") and sets a validation flag (e.g., "Validated Flag"). One embodiment of Attack Validation 408 will be described in more details below with reference to FIG. 5.

Target Exposure Analysis 409 can determine how likely a target (e.g., a machine) will be attacked and how likely it will be successfully attacked by an attacker. According to one embodiment of the invention, Target Exposure Analysis 409 can generate a target exposure rating (e.g., "TargetRating"). One embodiment of Target Exposure Analysis 409 will be described in more details below with reference to FIG. 6.

Attacker Rating 410 can determine whether the attacker is a returning attacker and whether the attacker is an aggressive attacker. According to one embodiment of the invention, Attacker Rating 410 can generate an attacker rating (e.g., "AttackerRating"). One embodiment of Attacker Rating 410 will be described in more details below with reference to FIG. 7.

Steps 411 and 412 can be optional. Negation Analysis 411 can determine whether an attack is a false positive event and whether to reduce the overall threat rating thus calculated by an amount (e.g., "NegativeRating"). According to one embodiment of the invention, the maximum amount of negation can be user-configurable and can be in the form of a pre-set value or user-defined percentage (e.g., 0, 15%, etc.). At step 412, user-defined post-processing rules may be applied. As one skilled in the art will appreciate, user-defined rules may differ from system to system, depending upon implementation.

At step 413, a final threat score (i.e., threat rating) can be determined. Embodiments of a threat rating will be described later in more details after components thereof are described with reference to FIGS. 5-8. Referring back to FIG. 4, setting a threat score at step 413 may optionally trigger one or more steps to be taken. As illustrated in FIG. 4, based on the threat score of an event, one or more defensive and/or corrective actions may be automatically taken (e.g., removing a worm-infected machine from the client's network). Alternatively, based on the result of the processing that has been performed so far to analyze a particular event, an incident pertaining to the event may be automatically built or created at step 415. The building of the incident having a certain event type, host type, and/or level of severity (i.e., threat score) may also trigger a defensive action to be automatically taken at step 414, as exemplified in FIG. 4. In one embodiment, the next event is then processed and analyzed according to flow 400 as described above.

Figure 5:
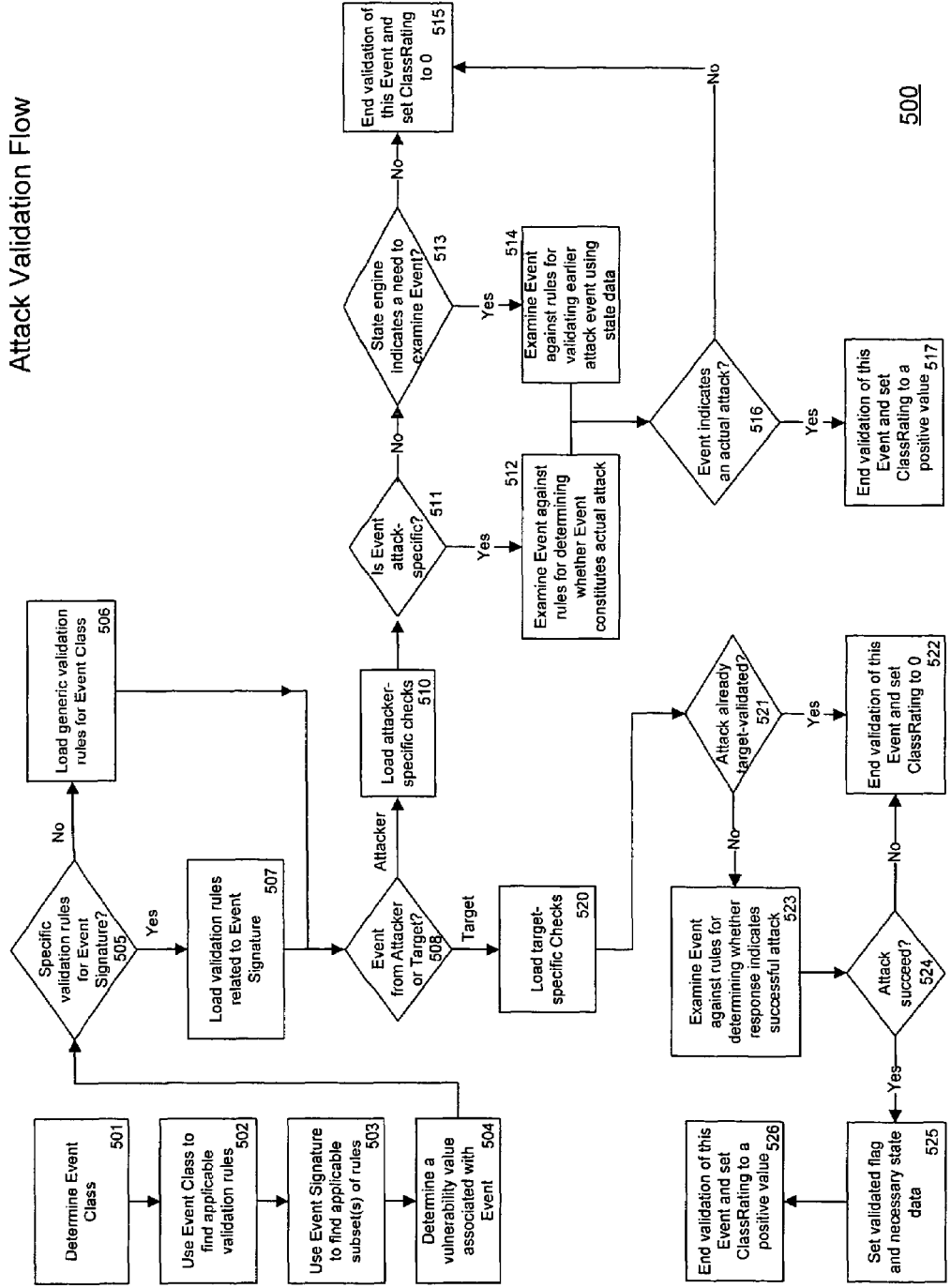
FIG. 5 is a flow diagram illustrating embodiments of Attack Validation of FIG. 4 in more details.

FIG. 5 is a flow diagram 500 illustrating embodiments of Attack Validation 408 of FIG. 4 in more details. Attack validation is specific to each attack type. In the example shown in FIG. 5, attack validation flow 500 operates to check whether an event is an attack or normal traffic that may resemble closely to an attack and whether the attack has what it takes to exploit what it is targeting.

More specifically, at step 501, flow 500 can determine the classification of an event. To optimize processing, it may be necessary to separate expert system rule bases into related groups, rather than loading all the rules for processing. In one embodiment, rule bases are first divided into event classes or grouping of similar event types, and then into specific rules sets for individual event types. Each class can have a class rating (e.g., ClassRating) that corresponds to a certain stage of a certain attack. The class rating can be zero initially and may be set to a predetermined value (e.g., 15, 33, 66, etc.), which can be configured according to user-defined rules.

At step 502, the event classification is used to find a rule base that applies to the event by class. At step 503, a signature associated with the event is used to find a subset of rules within the classification rule base that applies to the event based on the event signature. Within this disclosure, the term "signature" refers to a unique identifier for an event, indicating its system and/or subcomponent of origin and, when applicable, a specific type of behavior being represented by the event. At step 504, a vulnerability (e.g., VulnerableToAttack) associated with the target of the event is determined. VulnerableToAttack will be described in more details later with reference to FIG. 8. At step 505, flow 500 can determine whether specific validation rules associated with the event signature have been found. If so, they can be loaded at step 507. In the case where there are no specific rules for an event of a particular type or class, a general set of cases for the classification, or grouping, are loaded at step 506. For example, thousands of Web-based attacks may be determined via a simple level of validation in the status code that the Web server returns. Flow 500 next determines at step 508 whether the event is originating from an attacker or a target host. If the event is originating from an attacker, attacker-specific checks in the applicable validation rules are loaded at step 510.

As the system deals with both 'attack events' (i.e., those being generated by an attacker as an integral part of an attack) and 'response events' (i.e., those being generated in response to the attack by either the target or the attacker, but do not constitute the attack themselves), it can be beneficial to differentiate between these types of events before applying rules. If it is determined at step 511 that the event is attack-specific (e.g., an original event or an 'attack event' having a particular signature or abnormality), then the event is examined at step 512 to determine whether the event constitutes an actual attack (e.g., a wrong payload, etc.). If the event is not attack-specific (e.g., it is a 'response event', which may or may not be relevant to the attack), a state engine is consulted at step 513 to determine whether there is a need to further examine the event. This can be implemented by setting a flag during the examination of an earlier event in an event chain. According to one embodiment, if there is no need to further examine the event, attack validation flow 500 ends at step 515 and sets ClassRating to zero. An event may drop out early if it provides no useful information towards the validation of the attack. In this case, confidence parameters for validation (e.g., ClassRating) will not be altered. As one skilled in the art will appreciate, confidence parameters can differ for each attack. In embodiments of the invention, confidence parameters eventually result in a single numeric value (e.g., between 0 and 100) for attack validation, which can be independently set for each event. Depending upon whether a validated flag is set, the class rating of an earlier event may alter or affects the class rating of another event in the chain of events (e.g., an earlier event in the chain may trigger the validated flag to be set to 1, indicating an actual attack, which causes the class rating of another event in the chain to be set correspondingly).

At step 513, if the state engine indicates a need to further examine the event, then the event is examined at step 514 against validation rules (specific or generic rules for this class of events). At step 516, if it is determined that the event constitutes an actual attack, the event is validated and attack validation flow 500 ends at step 517. ClassRating is set to a positive value (e.g., 15). If the event does not constitute an actual attack, then ClassRating is set to zero and attack validation flow 500 ends at step 515.

The ability of attack validation flow 500 to differentiate event types prior to applying rule can be advantageous. Due to the nature of signature-based intrusion detection techniques, existing IDS- and IPS-based systems generally are not capable of differentiating between traffic that is truly malicious and traffic that merely appears similar or having similar content to malicious traffic. For this reason, specific case models must be developed in these systems to determine whether or not the event indicates an actual attempt to attack a target, or matched on a pattern (signature) without proper context. Also, in these prior systems, some attacks may not be validated on a single network packet (i.e., an event) as they may require multiple packets (e.g., fragmented attacks) being re-assembled on the receiving end. Contrastingly, in embodiments of the invention, rules and checks can be loaded and applied in the context of a single event. Thus, state properties may be set during processing to indicate that decisions must span multiple events. In this way, the underlying expert system can look for those properties to indicate whether a packet (i.e., an event) that would not normally be processed must be processed to complete a decision tree that was started with an earlier event.

Referring back to step 508, if the event is originating from a target host, then checks specific to the target host in the applicable validation rules are loaded at step 520 in preparation for the following steps. At step 521, it is determined whether the event is associated with a target-validated attack (e.g., a validated flag was set by an earlier 'attack event' in the chain of events). If so, there is no need for further processing this event (i.e., a 'response event' from the target host) and attack validation flow ends at step 522. In this case, ClassRating is set to zero. If the 'response event' is not associated with a target-validated attack, the response from the target host is examined at step 523 to ascertain whether the attack was successful. Examining the response from target host(s) can enhance the accuracy in determining whether an attack has succeeded, after it has been determined that the initial attack indicated a true attack behavior. This is the primary reason behind the capture of an entire 'chains of events'. The extra accuracy provided here more than makes up for the increase in time that it takes to validate an attack.

If it is determined at step 524 that the attack was not successful, then attack validation flow 500 ends at step 522 as described above. If the attack was successful, a validated flag is set and state data is collected for future decisions (see, e.g., step 514). Attack validation flow 500 then ends at step 526 and ClassRating is set to a predetermined value (e.g., if an attack was successful, the class rating for the corresponding event can be set to 100).

Unlike prior network-based instruction detection and prevention systems, attack validation flow 500 does not make a binary (i.e., "yes or no" or "true or false") decision on the validity of an event. Rather, the validity of an event is rated based on the event's class rating and the vulnerability of a target host to an attack associated with the event. In one embodiment, the attack validation rating is determined as follows:

$$\text{ValidRating} = (\text{ClassRating} * w_{class}) + (\text{VulnerableToAttack} * w_{vulnerability}),$$

where $w_{class}$ and $w_{vulnerability}$ are weights or modifiers of ClassRating and VulnerableToAttack, respective. Weights $w_{class}$ and $w_{vulnerability}$ can have different or the same predetermined value, which can be any user-defined number n where, for example, $0 < n \leq 1$ or $n \geq 1$. In one embodiment, ValidRating is normalized to 100. It should be understood that higher/lower weights or modifiers could be used for $w_{class}$ and $w_{vulnerability}$. As one skilled in the art will appreciate, weights $w_{class}$ and $w_{vulnerability}$ can vary depending upon implementation, for instance, as a way to weigh the level of importance of ClassRating and VulnerableToAttack (e.g., if in one implementation VulnerableToAttack is deemed more important than ClassRating, then $w_{vulnerability}$ may have a higher value than $w_{class}$). Weights $w_{class}$ and $w_{vulnerability}$ can be optional.

Figure 6:
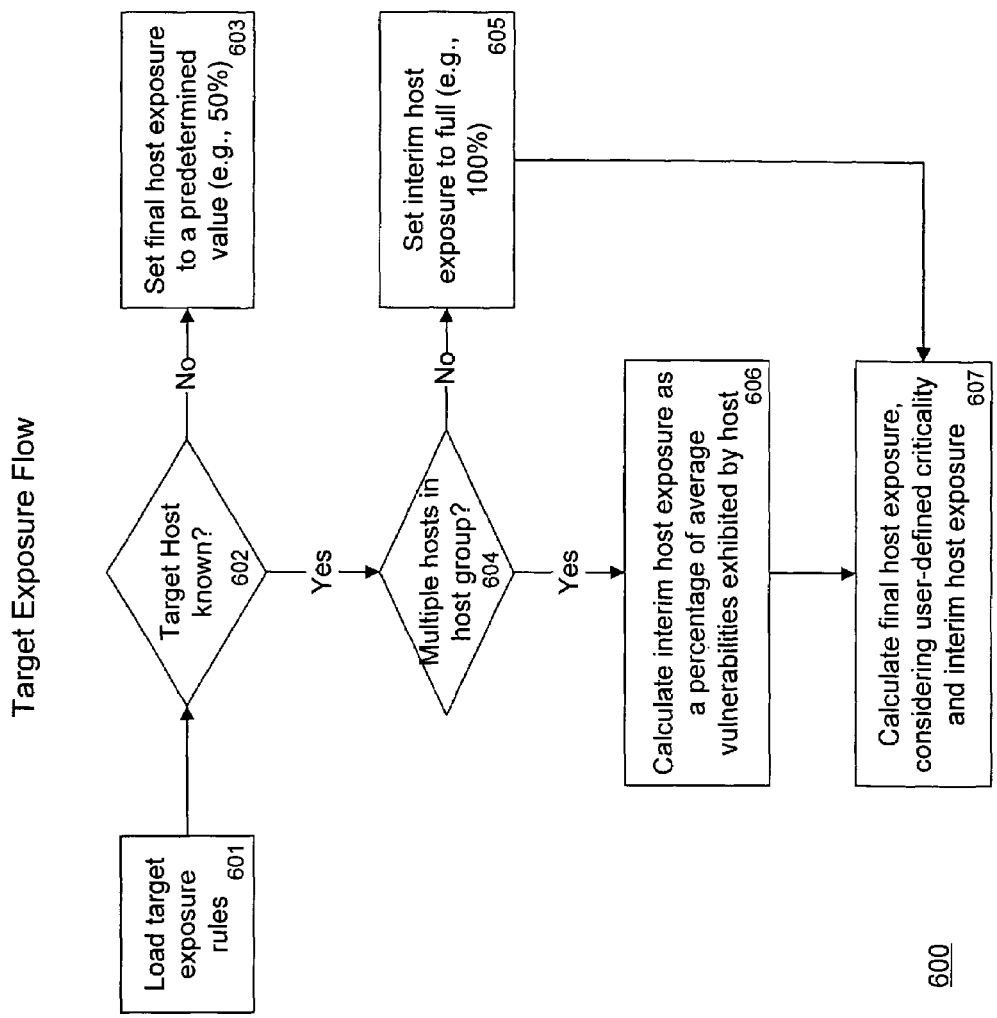
FIG. 6 is a flow diagram illustrating embodiments of Target Exposure Analysis of FIG. 4 in more details.

FIG. 6 is a flow diagram illustrating embodiments of Target Exposure Analysis 409 of FIG. 4 in more details. Target Exposure flow 600 is designed to analyze a target host's exposure and hence vulnerability to attack by examining whether the operating system ("OS") of the target host may be affected by a particular attack, whether the port being attacked known to be open, what is the value of an asset relative its criticality, what is the target host's exposure rating relative to other hosts on a network segment and to all hosts on the network (i.e., client network 102), and so on. Most automated analysis within known IDS- and IPS-based systems would not perform attacker sophistication or attack validation checks if the host is not—at the time of analysis—known to be vulnerable to attack. However, as new services can be installed at any time on boxes—quite often between scans, embodiments of the invention will simply reduce the value of the host and/or host network exposure checks if the host is not known to be vulnerable. In this manner, the system can easily detect attacks against hosts which are new to the network, or have changed between scans.

In embodiments of the invention, unsuccessful attacks can also be considered. An unsuccessful attack may be an indicator of a future successful attack and thus warrants attention. This is useful in cases where a critical host might be under attack from a skilled attacker in which information about unsuccessful attacks may prevent the attacker from succeeding in future attacks. When an attack has been validated, the value given to validation checks towards the total threat rating is increased, and is decreased when the attack can not be validated. This allows for large jumps in threat ratings between unsuccessful and successful events targeting the same host, but also allows for a higher threat given to events that target highly critical resources. Reliance on any bit of data in isolation may result in a false threat score, either set improperly too high or too low for real world conditions. Embodiments of the invention disclosed herein take into account numerous factors to generate an accurate threat rating that truly reflects the nature and severity of the threat for an event.

In the example shown in FIG. 6, target exposure rules are loaded at step 601 in preparation for the following steps. At step 602, Target Exposure flow 600 operates to determine whether the target host is known to the system (e.g., expert system 301 if no information is known about the target host (e.g., the system has not scanned client network 102), rather than assuming that the attack has no impact, or has the most serious impact, host exposure is set to a predetermined, default value (e.g., 50%). This allows the system some room to differentiate between hosts that are known to the system and those that are not when analyzing attacks. In this way, an attack against an unknown system will not automatically be a higher threat than an attack against a known and highly critical system.

If the system knows of the target host, at step 604, flow 600 operates to determine whether there are multiple hosts in a host group to which the target host belongs. In one embodiment, a user determines how hosts are grouped. In one embodiment, the size of a host group can be one. If a host group does not apply, an interim host exposure variable (e.g., InterimHostExp) is set to full or 100% at step 605. If a host group exists, the target exposure calculation takes into account the "neighborhood" (i.e., the host group) of the target host. In one embodiment, the exposure count of the target host (NumHostVulns) is compared against the average number of exposures (i.e., vulnerabilities) for the group (NumGroupVulns) at step 606. In one embodiment, the number of exposures (i.e., vulnerabilities) of each host can be obtained from a database. In one embodiment, the database contains all user-defined parameters and values associated therewith. In one embodiment, InterimHostExp=(NumHostVulns/NumGroupVulns)*100. In this way, the system can determine whether the target host is well-protected compared to its neighbors (i.e., how vulnerable it can be as compared to other hosts in the group).

In some embodiments, users (e.g., system administrators) may supply a defined criticality (e.g., TargetCriticality) for a given network resource or asset (e.g., a host machine may be 25% critical to client network 102). This user-defined criticality is a subjective value and is used to weigh attacks between different hosts. Asset criticality enables embodiments of the invention to increase or decrease the threat of an event based on the value of the target. Thus, those attacks against more critical assets may receive a higher threat rating than the same attack against a less critical asset as defined by the user. In other words, the same validated attack, originated from the same attacker, against a non-critical asset (e.g., a workstation) and a critical asset (e.g., a billing server), will result in two different threat scores—the billing server being higher than that of the workstation. Differentiating the threat score based on target criticality allows embodiments of the invention to optimize automated defense, triage and allocation of security resources by focusing first on the higher-valued resources, and then on the lower-valued resources.

At step 607, the final host exposure (e.g., TargetRating) is calculated, taking into consideration the user-defined asset criticality and the interim host exposure. In one embodiment, $$TargetRating=(InterimHostExp*w_{exposure})+(TargetCriticality*w_{criticality})$$

where $w_{exposure}$ and $w_{criticality}$ are weights or modifiers having a user-configurable value, which can be any number n where, for example, $0<n\leq1$ or $n\geq1$. In one embodiment, InterimHostExp and TargetCriticality are weighed about the same (e.g., $w_{exposure}=0.5$ and $w_{criticality}=0.5$). In one embodiment, TargetRating is normalized to 100. It should be understood that higher/lower weights or modifiers could be used for $w_{exposure}$ and $w_{criticality}$. As one skilled in the art will appreciate, weights $w_{exposure}$ and $w_{criticality}$ can vary depending upon implementation, for instance, as a way to weigh the level of importance of InterimHostExp and TargetCriticality (e.g., if in one implementation TargetCriticality is deemed more important than InterimHostExp, then $w_{criticality}$ may have a higher value than $w_{exposure}$). Weights $w_{exposure}$ and $w_{criticality}$ can be optional.

Figure 7:
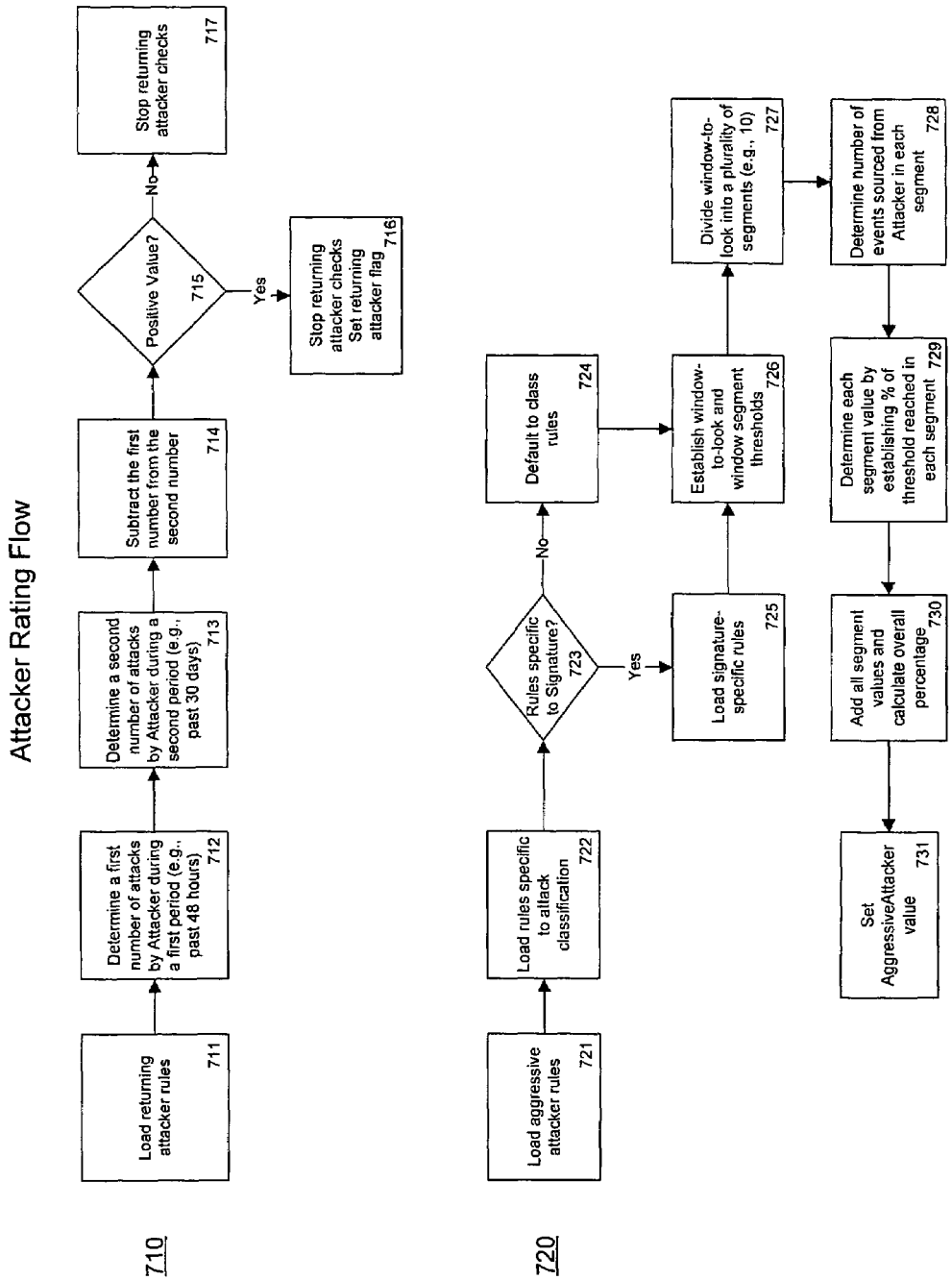
FIG. 7 is a flow diagram illustrating embodiments of Attack Rating of FIG. 4 in more details.

FIG. 7 is a flow diagram illustrating embodiments of Attack Rating 410 of FIG. 4 in more details. According to one embodiment of the invention, the flow diagram of FIG. 7 has two components: a flow 710 for determining whether an attacker is a returning attacker and a flow 720 for determining whether an attacker is an aggressive attacker. In one embodiment, at step 711, returning attacker rules are loaded. These rules may be hard-set or hard-coded for all attack types. Steps 712 to 714 operate to determine whether the attacker has attacked before and can be implemented in many different ways. For example, one embodiment can track the number of attacks per an attacker everyday. One embodiment can track the number of attacks per an attacker within a set period of time. One embodiment can track the number of attacks per an attacker during two different periods of time (e.g., whether the attacker has attacked before two days ago). In one embodiment, at step 712, the number of attacks of any type by an attacker within a first period of time (e.g., the last 48 hours) is counted. An attacker may be identified by the source address (e.g., an IP address, user ID, MAC address, etc. from where the attack is originated.) At step 713, the number of attacks of any type by the same attacker within a second, longer period of time (e.g., the past 30 days) is counted. In this case, the attacks for the first period are counted twice. Therefore, the count of attacks for the first period is subtracted from the count of attacks in the second period to generate a delta at step 714. The delta is checked at step 715 to determine whether it has a positive value. If not, flow 710 ends at step 717. In this case, no flag is set. If the delta has a positive value, it is determined that the attacker is a returning attacker. Thus, a returning attacker flag is set (e.g., ReturningAttacker=1) and flow 710 ends at step 716. It should be understood that other thresholds (e.g., other than simply positive) could be used to set the flag.

Steps 721 to 728 of flow 720 operate to determine whether an attacker is an aggressive attacker and how aggressive the attacker is by examining the recurrence and velocity of the attacks by the attacker within a window of time and generate a corresponding attacker rating (e.g., AttackerRating). More specifically, the attacker history is reviewed to determine the attacker's success/failure ratio. Each target attack is analyzed to determine whether the attack is a one-off or part of a large sweep (e.g., a reconnaissance network scanning activity or 'recon') and whether there was a prior recon to the target host and host network.

In one embodiment, AttackerRating is determined based on three factors: the severity associated with the event's signature (e.g., SignatureSeverity), the aggressiveness of the attacker (e.g., AggressiveAttacker), and the returning attacker flag (e.g., ReturningAttacker). The returning attacker flag may be set via flow 710 as described above. The severity of a signature can have a predetermined or user-defined value (e.g., between 0 and 100), can be a read-only property, and can be obtained from a database. In one embodiment, the aggressiveness of an attacker can be determined based on the classification of the event and perhaps the signature itself.

Again, the term "signature" is used in this disclosure to specify what an event is (e.g., what triggers the event). According to embodiments of the invention, an event may or may not be an attack and may or may not have a defined pattern of behavior. According to embodiments of the invention, an event can be triggered by a variety of factors, including an anomalous behavior, a suspicious activity, etc. Thus, within this disclosure, the term "signature" refers to a unique identifier for an event, indicating its system and/or subcomponent of origin and, when applicable, a specific type of behavior being represented by the event. In this manner, embodiments of the invention can process and analyze an event communicated from both signature-based and anomaly-based network intrusion detection sensors.

In the example shown in FIG. 7, at step 722, rules that are specific to the event's classification are loaded. Next, at step 723, it is determined whether there exist rules specific to the event's signature. If not, classification rules apply and flow 720 defaults to step 724. If so, signature-specific rules are loaded at step 725. At step 726, either the classification rules or the signature-specific rules are applied to establish a window-to-look time frame, number of window segments (time slices), and window segment thresholds. For a specific classification or signature a window of time is defined that is considered pertinent to that attack type. At step 727, that window of time is evenly divided to generate a group of window segments or time slices (e.g., 10) and a corresponding threshold is defined for the number of attacks that would indicate aggressive behavior for a given window segment or slice of time. The number of events sourced from the attacker in each window segment is determined at step 728. At step 729, it is determined what percentage of the threshold has been attained for each window segment. In one embodiment, the percentage is limited to 100%. At step 730, all segment values are added and the overall percentage is calculated. By adding all of these slices together and then dividing the total count by the number of slices, an aggressivity indicator (e.g., AggressiveAttacker) can be generated at step 731. In one embodiment, AggressiveAttacker is normalized as a percentage limited to 100%. It should be understood that such normalization is optional and can vary depending upon implementation.

In one embodiment, $$\text{AttackerRating} = ((\text{SignatureSeverity} * w_{severity}) + (\text{AggressiveAttacker} * w_{aggresivity})) * w_1 + (\text{ReturningAttacker} * w_{return}) * w_2),$$

were $w_{severity}$, $w_{aggresivity}$, $w_1$, $w_{return}$, and $w_2$ are user-configurable weights or modifiers each of which can have a value of any number, including 1. In one embodiment, $w_{severity}=0.5$, $w_{aggresivity}=0.5$, $w_1=0.85$, $w_{return}=0.15$, and $w_2=100$, such that AttackerRating=((SignatureSeverity*0.5)+(AggressiveAttacker*0.5))*0.85+(ReturningAttacker*0.15)*100). It should be understood that higher/lower weights or modifiers could be used for $w_{severity}$, $w_{aggresivity}$, $w_1$, $w_{return}$, and $w_2$. As one skilled in the art will appreciate, the user-configurable weights or modifiers $w_{severity}$, $w_{aggresivity}$, $w_1$, $w_{return}$, and $w_2$ can vary depending upon implementation, for instance, as a way to weigh the level of importance of SignatureSeverity, AggressiveAttacker, and ReturningAttacker. Weights $w_{severity}$, $w_{aggresivity}$, $w_1$, $w_{return}$, and $w_2$ can be optional.

Figure 8:
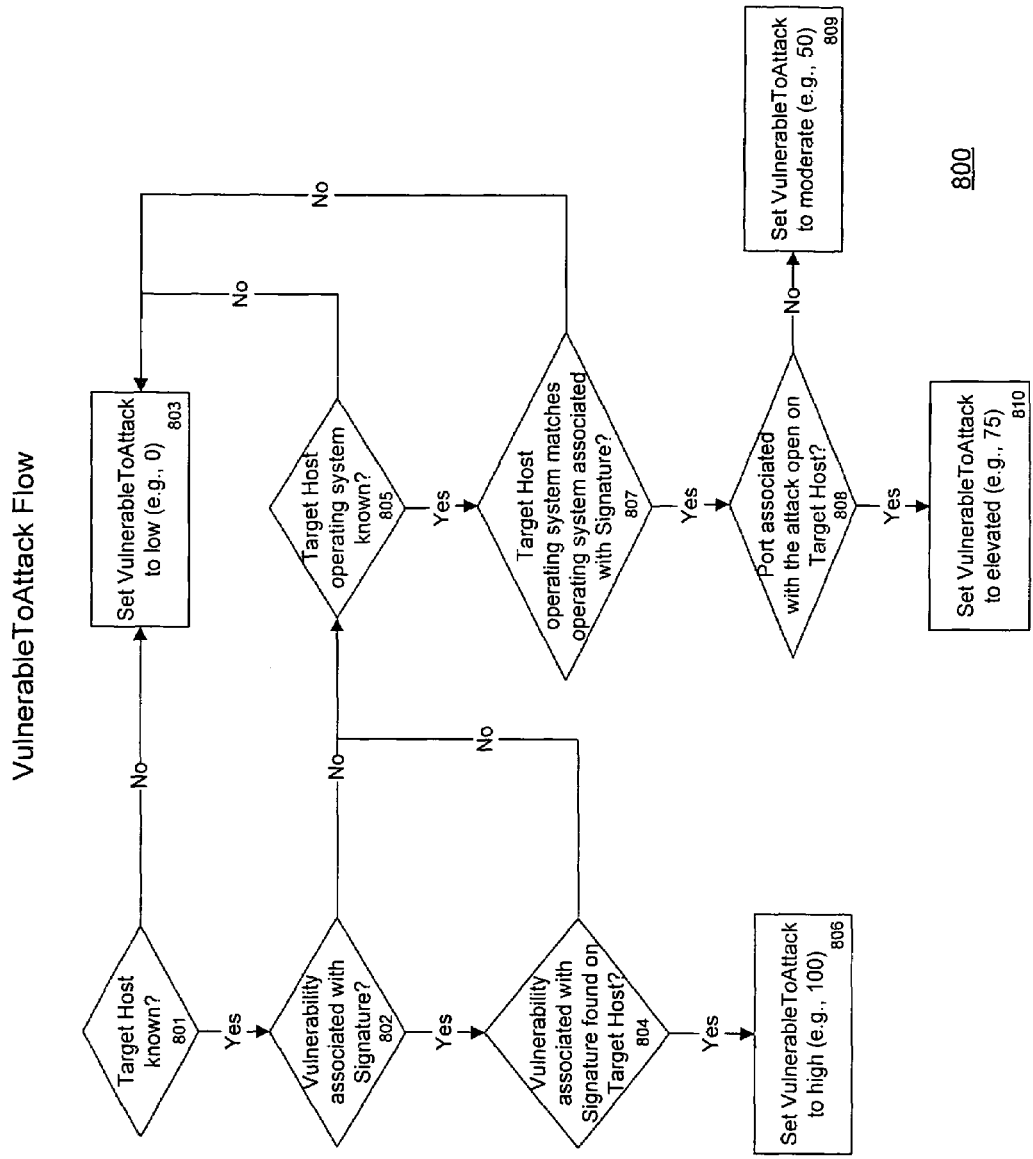
FIG. 8 is a flow diagram illustrating embodiments of VulnerableToAttack of FIG. 5 in more details.

FIG. 8 shows a flow diagram 800 illustrating embodiments of step 504 of FIG. 5 (i.e., determining a vulnerability value associated with an event) in more details. Flow 800 begins at step 801, which determines whether the target host is known to the underlying system (e.g., expert system 301) as being vulnerable. If the target host is not known to be vulnerable, its vulnerability to attack (e.g., VulnerableToAttack) is low. In one embodiment, VulnerableToAttack is set to zero and flow 800 ends at step 803. If the target host is known to be vulnerable, steps 802 to 810 operate to examine a plurality of factors (e.g., signature, operating system, port, etc.) associated with the target host and generate an appropriate VulnerableToAttack value accordingly. In the example shown in FIG. 8, at step 802, it is determined whether there is a vulnerability associated with the event's signature. If so, at step 804, it is determined whether the vulnerability associated with the event's signature can be found on the target host's list of vulnerabilities, which, as described above, can be read-only values obtained from a database. If there is a match, then the target host's vulnerability is high. In one embodiment, VulnerableToAttack is then set to 100 at step 806. If the system cannot find any vulnerability associated with the event's signature, then, at step 805, it is determined whether the target host's operating system (OS) is known to be vulnerable to attack by the underlying expert system. If OS is not known to be vulnerable, flow 800 ends at step 803 and VulnerableToAttack is set to low (e.g., 0). If OS is known to be vulnerable (but no vulnerability associated with the event's signature can be found at step 802), then a comparison is made at step 807 to determine whether OS matches the operating system associated with the event's signature. If so, the system checks to see whether any port associated with the attack are open on the target host. If so, at step 810, VulnerableToAttack is set to a value that indicates an elevated level of vulnerability of the target host (e.g., 75). If no port associated with the attack is open on the target host, at step 809, VulnerableToAttack is set to a value that indicates a moderate level of vulnerability of the target host (e.g., 50).

As described above, according to embodiments of the invention, the final threat rating of an event is determined based on at least three factors or components: the attacker rating (e.g., AttackerRating), the vulnerability of the target host (e.g., TargetRating), and the validity of the attack (e.g., ValidRating). Optionally, the threat rating can be negated with a user-define value (e.g., NegativeRating). In one embodiment, $$\text{Threat rating} = (\text{AttackerRating} * w_{attacker}) + (\text{TargetRating} * w_{target}) + (\text{ValidRating} * w_{validation}) - \text{NegativeRating,}$$

where $w_{attacker}$, $w_{target}$, and $w_{validation}$ are user-configurable weights or modifiers, which can be any user-defined numbers (e.g., between 0 and 1, 1, 123, etc.). In one embodiment, NegativeRating=0.

According to embodiments of the invention, the scores of individual components of the threat rating (i.e., ValidRating, TargetRating, and AttackerRating) may weigh differently depending upon whether the attack has been validated (i.e., whether an event constitutes a validated attack). In other words, depending upon whether Validated Flag is set, $w_{attacker}$, $w_{target}$, and $w_{validation}$ can have different predetermined values. This allows for greater distances (score-wise) between attacks that have and have not been validated, while allowing for proper variation within each group of validated attacks and of non-validated attacks.

In one embodiment, if Validated Flag is not set, $w_{target}$ and $w_{validation}$ can have about the same value, while $w_{attacker}$ may be about half of either $w_{target}$ or $w_{validation}$. For example, if $w_{target}=0.4$, $w_{validation}=0.4$, $w_{attacker}=0.2$, and NegativeRating=0, then threat rating=(AttackerRating*0.2)+(TargetRating*0.4)+(ValidRating*0.4), if Validated Flag is not set. In one embodiment, if Validated Flag is set, $w_{attacker}$, $w_{target}$, and $w_{validation}$ can have a different set of values such that ValidRating becomes the majority component (e.g., >50%) of the final threat score and AttackerRating and TargetRating together make up the rest (e.g., <50%). For example, if Validated Flag is set and NegativeRating=0, $w_{validation}=0.6$, $w_{target}=0.25$, and $w_{attacker}=0.15$, then threat rating=(AttackerRating*0.15)+(TargetRating*0.25)+(ValidRating*0.6).

These final weights (i.e., $w_{attacker}$, $w_{target}$, and $w_{validation}$) can be any user-defined number, including one (i.e., threat rating=AttackerRating+TargetRating+ValidRating). One skilled in the art will appreciate that, so long as a threat rating according to embodiments of the invention includes an attacker rating, a target rating, and a validation rating, other variables (e.g., NegativeRating), weights (e.g., $w_{attacker}$, $w_{target}$, and $w_{validation}$, etc.) and/or user-defined rules may be optionally implemented to suit.

A specific example of how the final threat rating can be calculated for an initial 'attack event' ("Event") from an attacker ("Attacker") to a target host ("Target") will now be described. Referring back to FIG. 5, at step 501, the event class ("Class") is determined to be 'attempted-admin'. At step 502, rules appropriate for the 'attempted-admin' class are loaded. At step 503, the event signature ("Signature") is determined to be 'XEXCH50 Overflow'. At step 504, VulnerableToAttack is calculated as described above with reference to FIG. 8. More specifically, it is determined that the target host is known to be vulnerable to attack (step 801) and there is a vulnerability associated with the event, which is identified by its signature as described above (step 802). No vulnerability can be found on the target host (step 804), but the target host's operating system is known to be vulnerable (step 805) and matches that associated with the event's signature (step 807). Since a port associated with the attack is open on the target host (step 808), VulnerableToAttack is set to 75.

Referring back to FIG. 5, rules specific to the 'XEXCH50 Overflow' signature (step 505) are loaded (step 507). Since Signature identifies that the event is originated from an attacker (step 508), attacker-specific checks (i.e., conditions) are loaded (step 510). In this case, the event is attack-specific (step 511) and constitutes an actual attack (step 512). More specifically, a first condition is met in which the payload of the event (e.g., a network packet) has content '/(?i:META\s+[^\s]{256,})/' and a second condition is also met in which the payload has content '/\x90{3,}/'. Accordingly, the system determines that the event indicates an actual attack (step 516), sets a state engine flat (e.g., has_xex_payload=1), and sets ClassRating to 85. In this example, $w_{class}$ and $w_{vulnerability}$ are equally of interest and are set to 0.75. Therefore, in this example, ValidRating=(ClassRating*$w_{class}$)+(VulnerableToAttack*$w_{vulnerability}$)=(85*0.75)+(75*0.75)=120, which is then normalized to 100.

Referring to FIG. 6, a target exposure analysis may be run in parallel to the attack validation process as described above. After loading target exposure rules (step 601), the system determines that the target host is known to be vulnerable to attacks (step 602) and there are multiple hosts in the host group to which the target host belongs (step 604). At step 606, the system then determines, in this example, the number of vulnerability V of the target host (e.g., V=5), the number of hosts H in the host group (e.g., H=10), the total number of the vulnerabilities T in the host group (e.g., T=80), and calculate the average vulnerabilities exhibited by hosts in the host group (e.g., Avg=(T/H)=8). A variable indicating the relationship between V (i.e., the number of vulnerability of the target host) and Avg (i.e., the average vulnerabilities exhibited by hosts in the host group) is calculated (e.g., InterimHostExp=(V/Avg)=(5/8)=0.625, which is then normalized to 62.5). To determine the final host exposure (e.g., TargetRating), user-defined asset criticality for the target host as well as $w_{exposure}$ and $w_{criticality}$ are retrieved from a database (e.g., TargetCriticality=30). In this example, $w_{exposure}$ and $w_{criticality}$ are equally of interest and are set to 0.5. Therefore, in this example, TargetRating=(InterimHostExp*$w_{exposure}$)+(TargetCriticality*$w_{criticality}$)=(62.5*0.5)+(30*0.5)=46.25.

Referring to FIG. 7, an attacker rating analysis may be run in parallel to either or both the attack validation process and the target exposure analysis as described above. In this example, returning attacker rules are loaded at step 711. The system operates to determine that the attacker of the current event has made a total of 5 attacks during the past 48 hours (step 712) and a total of 40 attacks during the past 30 days (step 713). The delta is thus determined to be 35 (step 714) and flow 710 returns a value of 1 (step 716). Next, rules for aggressive attacker are loaded at step 721 and rules specific to the classification are loaded at step 722. Since signature-specific rules apply (step 723), they are loaded at step 725. In this example, at step 726, a window-to-look is established (e.g., 5 minutes) and thresholds for individual segments thereof are set (e.g., 2). In this case, at step 727, the window-to-look time is divided into 10 even segments (e.g., 1 segment=30 seconds). At step 728, the number of events sourced from the attacker is determined for each segment. For example:

| | Segment: | | | | | | | | | |
|---|---|---|---|---|---|---|---|---|---|---|
| | 1 | 2 | 3 | 4 | 5 | 6 | 7 | 8 | 9 | 10 |
| Attacks: | 2 | 0 | 0 | 1 | 1 | 0 | 0 | 1 | 0 | 0 |

In this example, at step 729, the percentage of the number of events sourced from the attacker reaching the established threshold is determined for each segment. For example:

| | Segment: | | | | | | | | | |
|---|---|---|---|---|---|---|---|---|---|---|
| | 1 | 2 | 3 | 4 | 5 | 6 | 7 | 8 | 9 | 10 |
| % Threshold: | 100 | 0 | 0 | 50 | 50 | 0 | 0 | 50 | 0 | 0 |

Values from these segments are aggregated and then divided by the number of segments to obtain an overall percentage, which indicates the aggressiveness of the attacker (e.g., AggressiveAttacker=(100+50+50+50)/10=25. To determine AttackerRating, several user-defined values are retrieved from a database, including SignatureSeverity, $w_{severity}$, $w_{aggresivity}$, $w_{return}$, $w_1$, and $w_2$. In one embodiment, $$SignatureSeverity = 50, w_{severity} = 0.5, w_{aggresivity} = 0.5, w_1 = 0.85,$$

$$w_{return} = 0.15, \text{ and } w_2 = 100, \text{ such that}$$

$$AttackerRating = ((SignatureSeverity * w_{severity}) +$$
$$(AggressiveAttacker * w_{aggresivity})) * w_1 +$$
$$(ReturningAttacker * w_{return}) * w_2)$$
$$= ((50 * 0.5) + (25 * 0.5)) * 0.85 + (1 * 0.15) * 100)$$
$$= 46.875$$

At this point for this example, all major components of the threat rating have been determined (i.e., ValidRating=100, TargetRating=46.25, and AttackerRating=46.875). As described above, an attack negation analysis may optionally be implemented. In this example, an attack negation analysis will be implemented. More specifically, negation rules for the event's classification are first loaded. If there are negation rules specific to the event's signature, they are loaded as well. The negation rules include a check that determines whether the event is from an attacker or a target host. In this example, the event is from an attacker, so a negation value (e.g., NegativeRating) is set to zero, according to the negation rules. If the event had been sourced from the target host, the system would have operated to check for an authentication request, which might have indicated that the target host has been patched and therefore not vulnerable. In that case, NegativeRating might be set to a default value. In one embodiment, the default value is 15. Attack negation and user-defined checks are not further described herein as they are specific to each attack detected and can vary in practice, depending upon deployment and customer-specific requirements. The attack negation analysis can be useful in performing checks that are not handled by checks in the attack validation process or for specific conditions that conflict with the validation checks. For example, a specific attack may be validated by the attack validation process because it contains a string "X" in its payload (i.e., a rule may specify that the string "X" indicates an attack). However, it is a 'false attack' because it also contains a string "Z" in its payload (i.e., another rule may specify that the string "Z" indicates a false attack). In other words, the attack negation analysis can pick up where the attack validation process left off, among others.

In this example, since the event is an initial attack event from the attacker, no Validated Flag is set. Accordingly, a set of user-defined values including $w_{attacker}$, $w_{target}$, and $w_{validation}$ are retrieved from a database (e.g., $w_{attacker}=0.2$, $w_{target}=0.4$, and $w_{validation}=0.4$) such that Final threat rating = $(AttackerRating * w_{attacker})$ +

$(TargetRating * w_{target})$ +

$(ValidRating * w_{validation}) - NegativeRating$

-continued
= (46.875 * 0.2) + (46.25 * 0.4) + (100 * 0.4) − 0

= 67.875

Embodiments of the invention disclosed herein can be implemented by programming one or more computer systems (e.g., client and server machines) and devices (e.g., IDS sensors, switches, firewall appliances, etc.) with computer-executable instructions embodied in a computer-readable medium. When executed by a processor, these instructions operate to cause these computer systems and devices to perform one or more functions particular to embodiments of the invention disclosed herein (e.g., generate an appropriate threat rating or threat score for each event.) Programming techniques, computer languages, devices, and computer-readable media necessary to accomplish this are known in the art and thus will not be further described herein.

The following four examples illustrate one embodiment of the SES described above (referred herein as "Invision Security"). In particular, these examples illustrate two capabilities of the automated defense function of Invision Security: blocking and containment. More specifically, Invision Security can block malicious traffic by sending blocking signals to existing Layer 3 control devices (e.g., firewalls and routers implementing commercially available security products) and/or blocking the attack traffic at the perimeter of the network based on correlated and validated threats, reducing the possibility that valid traffic is being blocked. In addition, Invision Security can contain worm infected machines and/or compromised hosts by disconnecting the affected switch ports, thus removing or isolating them from the rest of the network. Invision Security may provide automated control over the network using known network management and discovery tools (e.g., using the Simple Network Management Protocol Version 3 (SNMPv3) to perform Address Resolution Protocol (ARP) table discovery, etc.).

Attack Scenario I: MS Blaster Infection
An external host infected with the MS Blaster worm attacks and infects a local workstation. A typical impact of this threat is an infection of other workstations on the internal network, gradually causing significant downtime due to the number of infected workstations attempting to spread the worm. Ability to reconfigure defenses and contain the infection is critical in preventing serious damage to the network.

| Step | Description | Automated Threat Analysis | Intrusion Defense and Containment |
|---|---|---|---|
| 1 | Invision Security detects an attempt to exploit the DCERPC services on a local workstation from an external host. | | |
| 1.1 | Invision Security correlates the target address to the vulnerability scanning data and is able to determine that the target host is running a version of Windows that is likely to be vulnerable to this attack. | Event severity is increased. | |
| 1.2 | Invision Security payload analysis validates that the attempt contains MS Blaster exploit payload. Customer's profile indicates that external attacks of this sort should be blocked at the firewall. Incoming attacks from the offending IP are blocked across the enterprise. | Event severity is increased. Infection is possible. | Block action is sent to the firewall to block incoming access from the attacker. |
| 1.3 | Invision Security correlates the source address of the event to the destination address of any other related DCERPC, MS Blaster, TFTP events and ICMP scan events. No matching events are found. | Event severity is unaffected. | |

-continued

Attack Scenario I: MS Blaster Infection
An external host infected with the MS Blaster worm attacks and infects a local workstation. A typical impact of this threat is an infection of other workstations on the internal network, gradually causing significant downtime due to the number of infected workstations attempting to spread the worm. Ability to reconfigure defenses and contain the infection is critical in preventing serious damage to the network.

| Step | Description | Automated Threat Analysis | Intrusion Defense and Containment |
|---|---|---|---|
| 2 | An outgoing TFTP request for the MS Blaster executable is detected originating from the local target host. | | |
| 2.1 | Invision Security correlates the source address to any related DCERPC exploit events destined for that address. Invision Security finds the incoming DCERPC attack from step 1. The customer's profile indicates that validated outgoing attempts of this sort should result in the local host being blocked from external access to eliminate the possibility that a worm infected workstation attacks other networks. Although it is possible for infection to have occurred, the customer's profile requires that the possibility of infection be absolute before this host can be removed from the network. | Event severity is increased. Possibility of infection is increased to probable. Security incident is created. All related attack events are automatically attached to the incident. | Block action is sent to the firewall to block outgoing access from the infected host. |
| 3 | Numerous ICMP requests are generated by the local target host attempting to detect other workstations that can be infected with the worm. | | |
| 3.1 | Invision Security correlates the ICMP requests to any outgoing TFTP requests and any incoming DCERPC exploit attempts. Invision Security finds both the incoming DCERPC exploit and the outgoing TFTP request from previous infections. The previously created incident is updated, but the possibility of infection is still not absolute. No containment actions are taken. | Event severity is increased. Possibility of infection is increased to highly probable. | |
| 4 | A DCERPC exploit attempt is detected originating from the previously infected host targeting a new workstation. | | |
| 4.1 | Invision Security correlates the target address to the vulnerability scanning data and is able to determine that the target host is running a version of Windows that is likely to be vulnerable to this attack. | Event severity is increased. | |
| 4.2 | Invision Security payload analysis validates that the attempt contains MS Blaster exploit payload. | Event severity is increased. Infection is possible. | |
| 4.3 | Invision Security correlates the source address of the event to the destination address of any other related DCERPC events, the source address of any MS Blaster TFTP events, and to the source address of any ICMP scan events from previous infections. An incoming DCERPC event, an outgoing TFTP event, and several ICMP scan events are found. The customer's profile indicates that validated worm infections should result in the local host being removed from the network. | Event severity is increased. Possibility of infection is increased to absolute. Previously created incident is updated. | The worm infected host is contained. The switch port serving the host is shut down. |

Attack Scenario II: Targeted Web Server Attack
An external attacker sweeps the network, looking for IIS web servers and attempts to exploit known flaws in IIS software packages to access cmd.exe and execute arbitrary commands.

| Step | Description | Automated Threat Analysis | Intrusion Defense and Containment |
|---|---|---|---|
| 1 | Invision Security detects numerous NMAP ICMP requests from an external host. | | |
| 1.1 | Invision Security correlates the source address of the attack to any previously detected attempts. None are found. | Event severity is unaffected. | |

-continued

Attack Scenario II: Targeted Web Server Attack
An external attacker sweeps the network, looking for IIS web servers and attempts to exploit known flaws in IIS software packages to access cmd.exe and execute arbitrary commands.

| Step | Description | Automated Threat Analysis | Intrusion Defense and Containment |
|---|---|---|---|
| 1.2 | Invision Security determines the number of unique hosts targeted in the sweep. The severity of the events are increased on a sliding scale as the number of hosts increases towards and exceeds a threshold which defines a likely network sweep. | An incident indicating that recon activity is occurring is generated. | |
| 2 | Invision Security detects a CMD.EXE access attempt destined towards an internal web server from the previous external host. | | |
| 2.1 | Invision Security correlates the target address to the vulnerability scanning data and is able to determine that the target host is running a version of windows that is likely to be vulnerable to this attack. | | |
| 2.2 | Invision Security also finds that the host has a known vulnerability in IIS that could be exploited in this manner. The customer's profile indicates that attempts to exploit access from the known vulnerabilities must be blocked. | Event severity is greatly increased. | Block action is sent to firewall to block incoming access from the attacker. Block action is sent to the firewall to block outgoing access from target host. |
| 2.3 | Invision Security correlates the source address of the attacker to the source address of any recon events. The previously detected NMAP ICMP events are found, and the attack is determined to be a targeted attack. | Event severity is increased. An incident is created, indicating an external attacker attempted to exploit a known flaw on the host through IIS. | |

Attack Scenario III: Yes Advertising Spybot Banking Trojan
A local user unintentionally becomes infected with the Yes Advertising Spybot Banking Trojan by accessing a malicious website.

| Step | Description | Automated Threat Analysis | Intrusion Defense and Containment |
|---|---|---|---|
| 1 | Invision Security detects an HTML document with an MHTML/CHM vulnerability exploit attempt being delivered to a local host. | | |
| 1.1 | Invision Security correlates the target address to the vulnerability scanning data and is able to determine that the target host is running Windows. Invision Security determines that the host is likely to be running Internet Explorer, which is vulnerable to this exploit. | Event severity is increased. | |
| 1.2 | SSDL Payload Analysis indicates that the content of the webpage contains an actual exploit attempt. | Event severity is increased. | |
| 2 | Invision Security detects an outgoing request to get a GIF file associated with the Yes Ad. Trojan sourced from the previous target host. | | |
| 2.1 | Invision Security correlates the source address to the destination address of any attempts to transmit a document with an MHTML/CHM vulnerability exploit. The previous event is found. | Event severity is increased. An incident is created. | Block action is sent to the firewall to block |

-continued

Attack Scenario III: Yes Advertising Spybot Banking Trojan
A local user unintentionally becomes infected with the Yes Advertising
Spybot Banking Trojan by accessing a malicious website.

| Step | Description | Automated Threat Analysis | Intrusion Defense and Containment |
|---|---|---|---|
| | According to the customer's blocking profile, any hosts compromised as such should be blocked from making further outgoing access attempts. | | outgoing access from compromised host. |

Attack Scenario IV: Attacker Utilizing Multiple Entry Points
An attacker performs a sweep of a distributed network covered by
several Invision Security Engine appliances, and then attempts several
different brute-force attempts on hosts monitored by different sensors.

| Step | Description | Automated Threat Analysis | Intrusion Defense and Containment |
|---|---|---|---|
| 1 | Several sensors detect numerous NMAP ICMP events from an external host. | | |
| 1.1 | Invision Security correlates the source address of the attack to any previously detected attempts. Several are found from different sensors. | Event severity is increased for all correlated events. | |
| 1.2 | Invision Security determines the number of unique hosts targeted in the sweep. The severity of the events is increased on a sliding scale as the number of hosts increases towards and exceeds a threshold which defines a likely network sweep. | An incident is created, linking all of the recon events. | |
| 2 | One sensor detects a number of SSH Brute Force attempts directed towards an internal host from the previous attacker. | | |
| 2.1 | Invision Security correlates the target address to the vulnerability scanning data and is able to determine that the target host is running an SSH server. | Event severity is increased. | |
| 2.2 | Invision Security correlates the source address of the attack to the source address of any reconnaissance events. Previously detected NMAP events are found, from all sensors. Customer's policy indicates that these sorts of attacks should be blocked at the firewall, and a shun request is sent to all firewalls known to each sensor. | Event severity is increased. Previously created incident is updated with a new summary; new events are added. | Block action is sent to the firewall to block incoming access from the attacker. |
| 3 | At the same time as step 2, another sensor detects a number of IIS WEBDAV exploit attempts from the external source. | | |
| 3.1 | Invision Security correlates the target address to the vulnerability scanning data and is able to determine that the target host is running an IIS Webserver, and is vulnerable to this attack. | Event severity is increased for all correlated events. | |
| 3.2 | Invision Security correlates the source address of the attack to the source address of any reconnaissance events. Previously detected NMAP events are found, from all sensors. Customer's policy indicates that these sorts of attacks should be blocked at the firewall, and a blocking request is sent to all firewalls known to each sensor. | Event severity is increased. Previously created incident is updated with a new summary; new events are added. | Block action is sent to the firewall to block incoming access from the attacker. |
| 4 | At the same time as step 2 and step 3, a third sensor detects a number of Samba brute-force login attempts from the external source. | | |
| 4.1 | Invision Security correlates the target address to the vulnerability scanning data and is able to determine that | Event severity is increased | |

-continued

Attack Scenario IV: Attacker Utilizing Multiple Entry Points
An attacker performs a sweep of a distributed network covered by
several Invision Security Engine appliances, and then attempts several
different brute-force attempts on hosts monitored by different sensors.

| Step | Description | Automated Threat Analysis | Intrusion Defense and Containment |
|---|---|---|---|
| | the target host is running Windows and is listening for incoming Samba connections. | for all correlated events. | |
| 4.2 | Invision Security correlates the source address of attack to the source address of any reconnaissance events. Previously detected NMAP events are found, from all sensors. Customer's policy indicates that these sorts of attacks should be blocked at the firewall, and a shun request is sent to all firewalls known to each sensor. | Event severity is increased. Previously created incident is updated with a new summary; new events are added. | Block action is sent to the firewall to block incoming access from the attacker. |

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. Accordingly, the scope of the invention should be determined by the following claims and their legal equivalents.

What is claimed is:

1. A method of analyzing an event detected in a distributed computer system, comprising:
at a receiving server machine in a security expert system, receiving information from said distributed computer system over a network, wherein said information comprises said event and wherein said event is detected by a device in said distributed computer system;
storing said event in a database in said security expert system;
at an expert system server machine in said security expert system:
retrieving said event from said database;
determining an attack validation value associated with said event;
determining a target exposure value associated with a host targeted by said event;
determining an attacker rating value associated with an attacker originating said event; and
determining a threat rating for said event utilizing said attack validation value, said target exposure value, and said attacker rating value; and
displaying said threat rating on a user interface for said security expert system.

2. The method according to claim 1, wherein the step of determining a threat rating for said event further comprises utilizing a negation value.

3. The method according to claim 1, further comprising performing user-defined pre-processing checks, user-defined post-processing checks, or a combination thereof.

4. The method according to claim 1, further comprising creating an incident based on said event and said threat rating.

5. The method according to claim 1, further comprising taking a defensive action, a corrective action, or a combination thereof, based on said threat rating.

6. The method according to claim 1, wherein the step of determining an attack validation value further comprises determining whether an attack associated with said event was successful.

7. The method according to claim 6, in which said attack associated with said event was successful, further comprises setting a validated flag.

8. The method according to claim 1, wherein the step of determining an attack validation value further comprises:
determining a class rating value;
determining a vulnerability to attack value for said host; and
utilizing said class rating value and said vulnerability to attack value to calculate said attack validation value.

9. The method according to claim 8, wherein the step of determining a class rating value further comprises:
determining whether said event is from said attacker or from said host; and
applying attacker-specific rules if said event is from said attacker or target-specific rules if said event is from said host.

10. The method according to claim 9, wherein the step of determining a class rating value further comprises determining an event signature and applying validation rules associated with said event signature to calculate said class rating value.

11. The method according to claim 8, wherein the step of determining a vulnerability to attack value for said host further comprises:
determining a plurality of factors associated with said host, said plurality of factors including whether said host is known to be vulnerable, whether a vulnerability associated with an event signature can be found on said host, whether said host is running an operating system known to be vulnerable, whether said operating system matches that associated with said event signature, and whether a port is open on said host.

12. The method according to claim 8, further comprising:
applying a first weight factor to said class rating value; and
applying a second weight factor to vulnerability to attack value for said host.

13. The method according to claim 1, wherein the step of determining a target exposure value associated with a host targeted by said event further comprises:
- determining an interim host exposure value;
- determining a target criticality value associated with said host; and
- utilizing said interim host exposure value and said target criticality value associated with said host to calculate said target exposure value associated with said host.

14. The method according to claim 13, further comprising:
- applying a third weight factor to said interim host exposure value; and
- applying a fourth weight factor to said target criticality value associated with said host.

15. The method according to claim 13, wherein the step of determining an interim host exposure value further comprises dividing a total number of exposures associated with said host by a number of average exposures exhibited by one or more hosts in a host group to which said host belongs.

16. The method according to claim 15, wherein the step of determining a target criticality value associated with said host further comprises searching an asset criticality table having user-specified assets and corresponding user-defined asset criticality values.

17. The method according to claim 1, wherein the step of determining an attacker rating value associated with an attacker originating said event further comprises:
- determining at least two factors from a plurality of actors, said plurality of factors including a signature severity value, an aggressive attacker value, and a returning attacker value; and
- utilizing said at least two factors to calculate said attacker rating value.

18. The method according to claim 17, further comprising:
- applying a fifth weight factor to said signature severity value;
- applying a sixth weight factor to said aggressive attacker value; and
- applying a seventh weight factor to said returning attacker value.

19. The method according to claim 18, further comprising:
- obtaining said signature severity value from a table of severity values for signatures stored in a database.

20. The method according to claim 19, the step of determining said aggressive attacker value further comprises:
- applying aggressive attacker rules to a window of time and number of events within the window; and
- applying an eighth weight factor to said signature severity value and said aggressive attacker value.

21. The method according to claim 20, wherein the step of determining said returning attacker value further comprises:
- determining whether said attacker has attacked before within a predetermined time period; and
- applying a ninth weight factor to said returning attacker value.

22. The method according to claim 1, further comprising:
- applying one or more weighting factors to one or more of said attack validation value associated with said event, said target exposure value associated with said host targeted by said event, and said attacker rating value associated with said attacker.

23. The method according to claim 22, in which if a validated flag is set, a weighting factor is applied to said attack validation value associated with said event such that said attack validation value has majority over said target exposure value and said attacker rating value.

24. The method according to claim 22, in which if a validated flag is set, said threat rating=(said attacker rating value*0.15)+(said target exposure value*0.25)+(said attack validation value*0.6)−(a negation value); and, if a validated flag is not set, said threat rating=(said attacker rating value*0.2)+(said target exposure value*0.4)+(said attack validation value*0.4)−(a negation value).

25. A computer program product comprising a computer-readable storage medium carrying program instructions executable on a security expert system, wherein said program instructions comprise:
- code for receiving information from a distributed computer system over a network, wherein said information comprises an event detected by a device in said distributed computer system;
- code for storing said event in a database;
- code for retrieving said event from said database;
- code for determining an attack validation value associated with said event;
- code for determining a target exposure value associated with a host targeted by said event;
- code for determining an attacker rating value associated with an attacker originating said event;
- code for determining a threat rating for said event utilizing said attack validation value, said target exposure value, and said attacker rating value; and
- code for displaying said threat rating on a user interface for said security expert system.

26. A computer system, comprising:
- a receiving server machine for receiving information from a distributed computer system over a network, wherein said information comprises an event detected by a device in said distributed computer system;
- a database for storing said event; and
- an expert system server machine for
  - retrieving said event from said database;
  - determining an attack validation value associated with said event;
  - determining a target exposure value associated with a host targeted by said event;
  - determining an attacker rating value associated with an attacker originating said event; and
  - determining a threat rating for said event utilizing said attack validation value, said target exposure value, and said attacker rating value.

* * * * *